(12) United States Patent
Hashiguchi et al.

(10) Patent No.: US 12,743,006 B2
(45) Date of Patent: Sep. 22, 2026

(54) IMAGING APPARATUS, CONTROL METHOD, AND PROGRAM

(71) Applicant: FUJIFILM Corporation, Tokyo (JP)

(72) Inventors: Akihiro Hashiguchi, Saitama (JP); Takeo Hyodo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 187 days.

(21) Appl. No.: 18/655,671

(22) Filed: May 6, 2024

(65) Prior Publication Data

US 2024/0377717 A1 Nov. 14, 2024

(30) Foreign Application Priority Data

May 10, 2023 (JP) ................................ 2023-078121

(51) Int. Cl.
*G03B 17/52* (2021.01)
*G03B 15/08* (2021.01)
*G03B 17/24* (2021.01)

(52) U.S. Cl.
CPC ........... *G03B 17/245* (2013.01); *G03B 15/08* (2013.01); *G03B 17/52* (2013.01)

(58) Field of Classification Search
CPC .............. G03B 17/52; G03B 2217/243; G03B 2217/248
USPC .......................................................... 396/317
See application file for complete search history.

(56) References Cited

U.S. PATENT DOCUMENTS 3,528,737 A * 9/1970 Denner .................. G03B 15/04 355/71
4,508,440 A * 4/1985 Costa ..................... G03B 17/52 396/350
4,717,930 A * 1/1988 Wheeler ................ G03B 17/24 396/332
H654 H * 7/1989 Doyle, Jr. et al. ............ 396/545
5,471,267 A 11/1995 Goto et al.
6,289,181 B1 9/2001 Lau et al.
6,343,190 B1 * 1/2002 Abe ................... H04N 1/00257 396/30
6,353,714 B1 * 3/2002 Zawodny ............. G03B 17/245 396/335
2002/0191102 A1 12/2002 Yuyama et al.

FOREIGN PATENT DOCUMENTS

CA 2230360 A1 9/1998
GB 2321113 A 7/1998
GB 2344186 A 5/2000
(Continued)

OTHER PUBLICATIONS

Extended European Search Report issued in EP 24 17 4427.5-1001 by the European Patent Office on Oct. 25, 2024, which is related to U.S. Appl. No. 18/655,671.

*Primary Examiner* — Leon W Rhodes, Jr.
(74) *Attorney, Agent, or Firm* — Studebaker Brackett PLLC

(57) ABSTRACT

An imaging apparatus includes a housing loaded with a film on which a photosensitive surface is caused to be exposed to subject light to record a subject image, and a light source that is provided in the housing and is capable of emitting, to the photosensitive surface, effect light that exposes the photosensitive surface in a manner superimposed on the subject light to impart a visual effect to the subject image.

24 Claims, 21 Drawing Sheets

(56) References Cited

FOREIGN PATENT DOCUMENTS

| | | | |
|---|---|---|---|
| JP | H11-52454 | A | 2/1999 |
| JP | H11-119335 | A | 4/1999 |
| JP | H11-252413 | A | 9/1999 |

* cited by examiner

FIG. 9
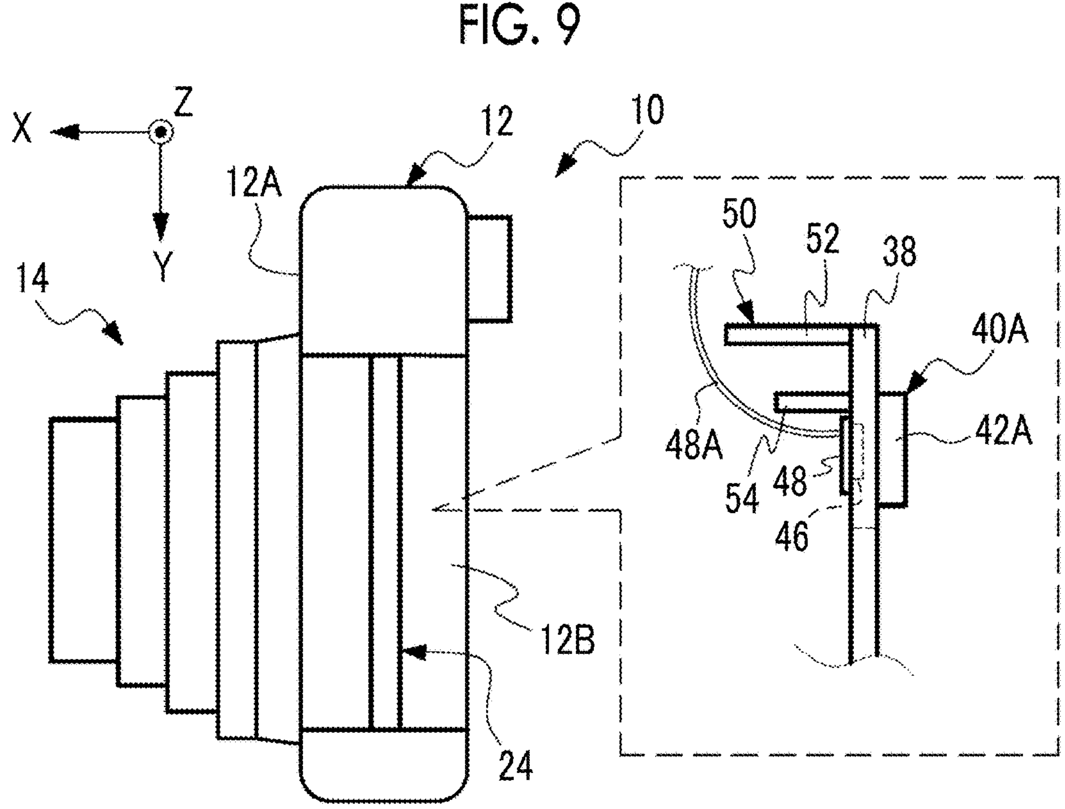
HOUSED
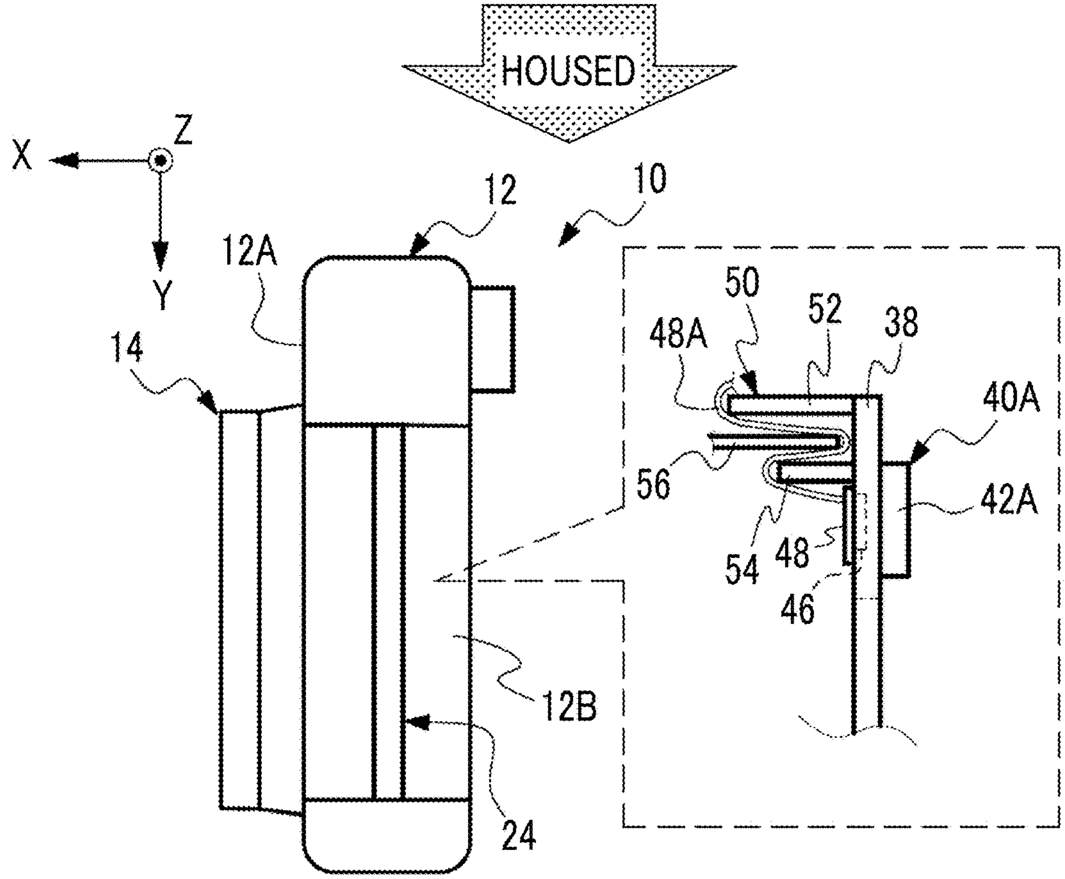

FIG. 10

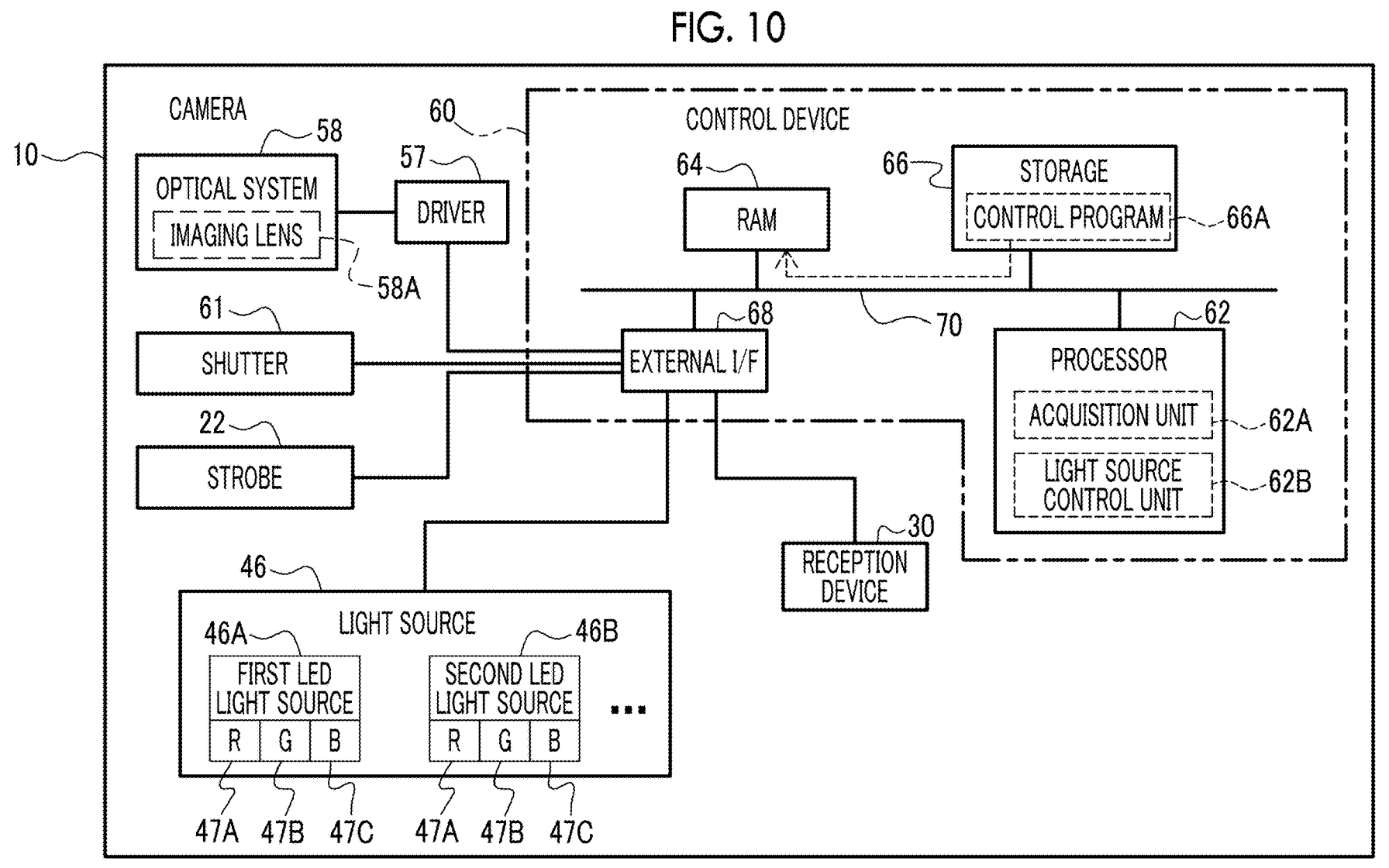

10
CAMERA
CONTROL DEVICE
STORAGE
CONTROL PROGRAM
66A
66
RAM
64
70
62
PROCESSOR
ACQUISITION UNIT
62A
LIGHT SOURCE CONTROL UNIT
62B
EXTERNAL I/F
68
RECEPTION DEVICE
30
60
DRIVER
57
OPTICAL SYSTEM
IMAGING LENS
58
58A
SHUTTER
61
STROBE
22
LIGHT SOURCE
46
FIRST LED LIGHT SOURCE
46A
R
G
B
47A
47B
47C
SECOND LED LIGHT SOURCE
46B
R
G
B
47A
47B
47C
...

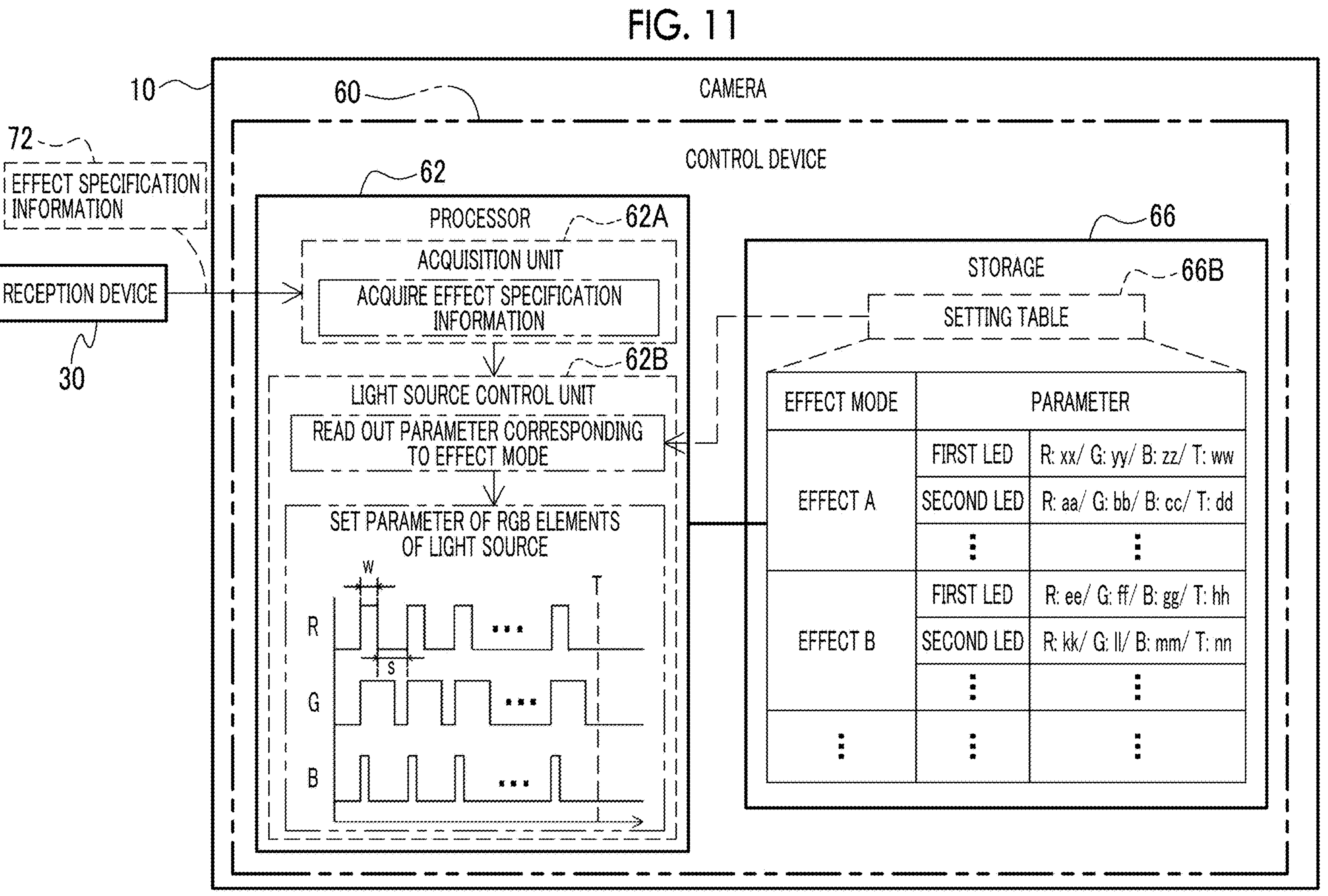

FIG. 11
10
60
CAMERA
72
EFFECT SPECIFICATION INFORMATION
CONTROL DEVICE
62
PROCESSOR
62A
ACQUISITION UNIT
ACQUIRE EFFECT SPECIFICATION INFORMATION
RECEPTION DEVICE
30
62B
LIGHT SOURCE CONTROL UNIT
READ OUT PARAMETER CORRESPONDING TO EFFECT MODE
SET PARAMETER OF RGB ELEMENTS OF LIGHT SOURCE
W
T
R
S
G
B
66
STORAGE
66B
SETTING TABLE
EFFECT MODE
PARAMETER
EFFECT A
FIRST LED
R: xx/ G: yy/ B: zz/ T: ww
SECOND LED
R: aa/ G: bb/ B: cc/ T: dd
EFFECT B
FIRST LED
R: ee/ G: ff/ B: gg/ T: hh
SECOND LED
R: kk/ G: ll/ B: mm/ T: nn

FIG. 21

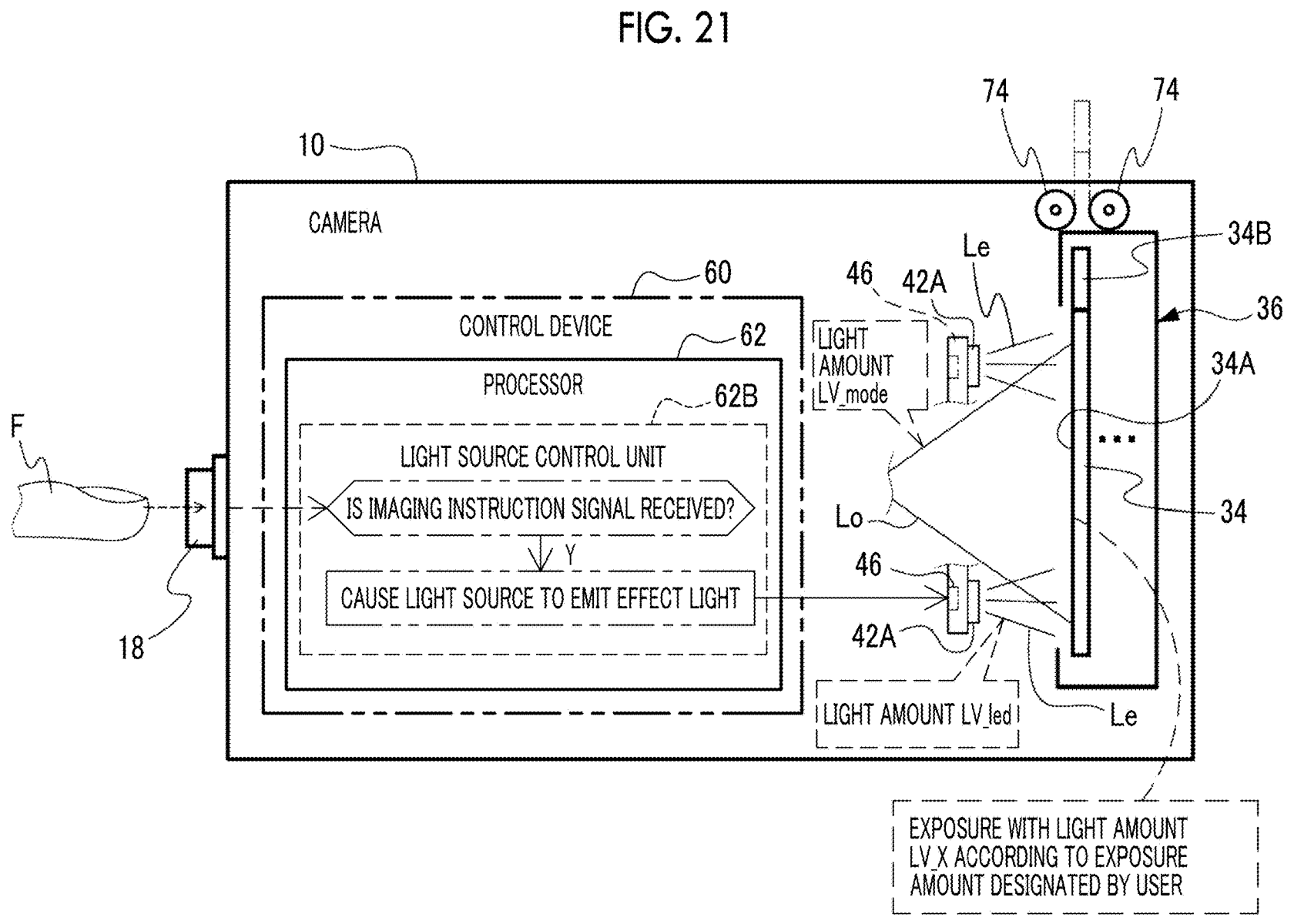

10
CAMERA
60
CONTROL DEVICE
62
PROCESSOR
62B
LIGHT SOURCE CONTROL UNIT
IS IMAGING INSTRUCTION SIGNAL RECEIVED?
Y
CAUSE LIGHT SOURCE TO EMIT EFFECT LIGHT
74
74
34B
36
34A
34
Le
Le
42A
42A
46
46
Lo
LIGHT AMOUNT LV_mode
LIGHT AMOUNT LV_led
EXPOSURE WITH LIGHT AMOUNT LV_X ACCORDING TO EXPOSURE AMOUNT DESIGNATED BY USER
18
F CAMERA
10A
CONTROL DEVICE
60
STORAGE
CONTROL PROGRAM
66A
66
70
PROCESSOR
62
ACQUISITION UNIT
62A
LIGHT SOURCE CONTROL UNIT
62B
RAM
64
EXTERNAL I/F
68
RECEPTION DEVICE
30
STROBE
22
SHUTTER
61
80
80A
Le
42A
46
Lo
OPTICAL SYSTEM
58
IMAGING LENS
58A
DRIVER
57

IMAGING APPARATUS, CONTROL METHOD, AND PROGRAM

CROSS REFERENCE TO RELATED APPLICATIONS

This application claims priority from Japanese Application No. 2023-078121, filed on May 10, 2023, the entire disclosure of which is incorporated herein by reference.

BACKGROUND

1. Technical Field

The present invention relates to an imaging apparatus, a control method, and a non-transitory storage medium storing a program.

2. Related Art

JP1999-119335A (JP-H11-119335A) discloses a close-up adapter consisting of an adapter body that is attachably and detachably attached to a camera and a close-up lens that is provided in the adapter body and is positioned on a front surface of an imaging lens in a case where the adapter body is mounted on the camera, in which the close-up lens is subjected to surface treatment to be a semi-transparent convex surface mirror and shows substantially the same range as an imaging range in a case where the convex surface mirror is viewed from a position to be closed up.

JP1999-52454A (JP-H11-52454A) discloses a general-purpose photo filter that is used in a camera, the photo filter consisting of a plate-shaped transparent main body and a filter part provided in a central portion of the main body, in which the filter part is subjected to a surface process of colorless or any one of colors of blue, pink, yellow, green, or sepia, or any one of combinations of three colors among the colors, or any one of shape processes of a rough surface, emboss, a fisheye, a compound eye, or a slit, or a combination of one of the colors and one of the shape processes and faces a front surface of a lens portion of a film with a lens and the main body is provided with a mounting member that can be attached to a camera body.

JP1999-252413A (JP-H11-252413A) discloses an electronic camera device with an optical finder, in the electronic camera device having an imaging unit and an optical finder section, in which the optical finder section has an effect filter mounting portion and is provided with a filter type discrimination unit that discriminates a type of an effect filter mounted on the mounting portion.

SUMMARY

One embodiment according to the present invention provides an imaging apparatus, a control method, and a non-transitory storage medium storing a program capable of imparting a visual effect to a subject image.

An imaging apparatus according to a first aspect of the present invention comprises a housing loaded with a film on which a photosensitive surface is caused to be exposed to subject light to record a subject image, and a light source that is provided in the housing and is capable of emitting, to the photosensitive surface, effect light that exposes the photosensitive surface in a manner superimposed on the subject light to impart a visual effect to the subject image.

According to a second aspect of the present invention, in the imaging apparatus according to the first aspect, the light source is provided, in the housing, around an exposure aperture through which the subject light passes.

According to a third aspect of the present invention, in the imaging apparatus according to the second aspect, the housing includes a frame member provided with the exposure aperture, and the light source is provided on the frame member.

According to a fourth aspect of the present invention, in the imaging apparatus according to the second aspect, the housing has a housing body into which the film is loaded and the exposure aperture, and the light source is disposed around the exposure aperture in the housing body.

According to a fifth aspect of the present invention, in the imaging apparatus according to the first aspect, the housing has a housing body into which the film is loaded, and the light source is fixed to the housing body.

According to a sixth aspect of the present invention, in the imaging apparatus according to the first aspect, a diffusion member that diffuses the effect light is included, and the effect light diffused by the diffusion member is emitted to the photosensitive surface.

According to a seventh aspect of the present invention, in the imaging apparatus according to the sixth aspect, a plurality of the light sources are provided, and the diffusion member is a member in which at least two diffusion parts respectively disposed facing at least two light sources among the plurality of light sources are connected to a coupling part that couples the diffusion parts.

According to an eighth aspect of the present invention, in the imaging apparatus according to the seventh aspect, the diffusion member further includes a light shielding member that shields effect light leaking from the coupling part toward the photosensitive surface by propagating from the diffusion part to the coupling part.

According to a ninth aspect of the present invention, in the imaging apparatus according to the first aspect, a plurality of the light sources are provided, and the plurality of light sources are disposed at positions symmetrical with respect to a center of the photosensitive surface of the film in a case where the film in a loaded state is viewed in a plan view.

According to a tenth aspect of the present invention, in the imaging apparatus according to the first aspect, the light source is provided at a position facing an outer peripheral edge of the photosensitive surface of the film.

According to an eleventh aspect of the present invention, in the imaging apparatus according to the tenth aspect, the light source is provided at a position facing at least one of four corners of the photosensitive surface of the film.

According to a twelfth aspect of the present invention, in the imaging apparatus according to the tenth aspect, the light source is provided at a position facing an intermediate position of at least one of four sides of the photosensitive surface of the film.

According to a thirteenth aspect of the present invention, in the imaging apparatus according to the first aspect, the light source is disposed concentrically with respect to a center of the photosensitive surface of the film in a case where the film in a loaded state is viewed in a plan view.

According to a fourteenth aspect of the present invention, in the imaging apparatus according to the first aspect, one light source is provided in the housing.

According to a fifteenth aspect of the present invention, in the imaging apparatus according to the first aspect, the light source is capable of emitting a plurality of types of the effect light for obtaining different types of the visual effect according to setting of a parameter, the imaging apparatus further comprises a reception unit that receives designation of a type of the visual effect and a processor, and the processor is configured to acquire effect specification information capable of specifying the type of the visual effect received via the reception unit, and execute control of setting the parameter according to the type of the visual effect indicated by the effect specification information.

According to a sixteenth aspect of the present invention, in the imaging apparatus according to the fifteenth aspect, the light source is configured of a plurality of colors of light emitting elements that emit light of different colors, and is capable of emitting a plurality of types of the effect light by adjusting a light amount ratio of the pieces of light emitted by the light emitting elements of respective colors.

According to a seventeenth aspect of the present invention, in the imaging apparatus according to the sixteenth aspect, the light emitting elements of the respective colors perform pulse light emission according to a periodically input driving pulse, and the parameter includes at least one of a duty ratio of the driving pulse of the light emitting element or a light emission time decided by a repetition number of the driving pulse.

According to an eighteenth aspect of the present invention, in the imaging apparatus according to the seventeenth aspect, the light emitting element is an LED.

According to a nineteenth aspect of the present invention, in the imaging apparatus according to the fifteenth aspect, the processor is configured to, in a case where designation by a user regarding an exposure amount of the photosensitive surface is received, execute exposure control of adjusting an amount of the subject light reaching the photosensitive surface according to an amount of the effect light emitted from the light source.

According to a twentieth aspect of the present invention, in the imaging apparatus according to the nineteenth aspect, the exposure control is control of executing adjustment of setting a light amount, which is obtained by subtracting the amount of the effect light from a light amount according to the designation by the user regarding the exposure amount, to the amount of the subject light.

According to a twenty-first aspect of the present invention, in the imaging apparatus according to the first aspect, the film is an instant film in which a developer for developing a latent image recorded on the photosensitive surface is sealed and the developer is capable of being applied on the exposed photosensitive surface.

According to a twenty-second aspect of the present invention, in the imaging apparatus according to the first aspect, the visual effect includes a tone effect which is an effect of adding a change to color development of the film.

According to a twenty-third aspect of the present invention, there is provided a control method for a camera including a housing loaded with a film on which a photosensitive surface is caused to be exposed to subject light to record a subject image and a light source that is provided in the housing and is capable of emitting, to the photosensitive surface, effect light that exposes the photosensitive surface in a manner superimposed on the subject light to impart a visual effect to the subject image, in which the light source is capable of emitting a plurality of types of effect light for obtaining different types of the visual effect according to setting of a parameter. The control method comprises acquiring effect specification information capable of specifying the type of the visual effect, and executing control of setting the parameter according to the type of the visual effect indicated by the effect specification information.

According to a twenty-fourth aspect of the present invention, there is provided a non-transitory storage medium storing a program causing a computer to execute a process in a camera including a housing loaded with a film on which a photosensitive surface is caused to be exposed to subject light to record a subject image and a light source that is provided in the housing and is capable of emitting, to the photosensitive surface, effect light that exposes the photosensitive surface in a manner superimposed on the subject light to impart a visual effect to the subject image, in which the light source is capable of emitting a plurality of types of effect light for obtaining different types of the visual effect according to setting of a parameter. The process comprises acquiring effect specification information capable of specifying the type of the visual effect, and executing control of setting the parameter according to the type of the visual effect indicated by the effect specification information.

An imaging apparatus according to a twenty-fifth aspect of the present invention comprises a housing in which an imaging element that causes a light-receiving surface to be exposed to subject light to capture a subject image is disposed, and a light source that is provided in the housing and is capable of emitting, to the light-receiving surface, effect light that exposes the light-receiving surface in a manner superimposed on the subject light to impart a visual effect to the subject image.

BRIEF DESCRIPTION OF THE DRAWINGS

FIG. 9 is a conceptual diagram showing an example of a configuration of an extra length processing structure according to the embodiment.

FIG. 10 is a block diagram showing an example of a hardware configuration of an electric system of the camera according to the embodiment.

FIG. 11 is a conceptual diagram showing an example of a main function of a processor of the camera according to the embodiment.

FIG. 21 is a conceptual diagram showing the example of the main functions of the processor of the camera according to the embodiment.

DESCRIPTION OF EMBODIMENTS

Examples of embodiments of an imaging apparatus according to the technique of the present disclosure will be described in accordance with accompanying drawings.

Figure 1:
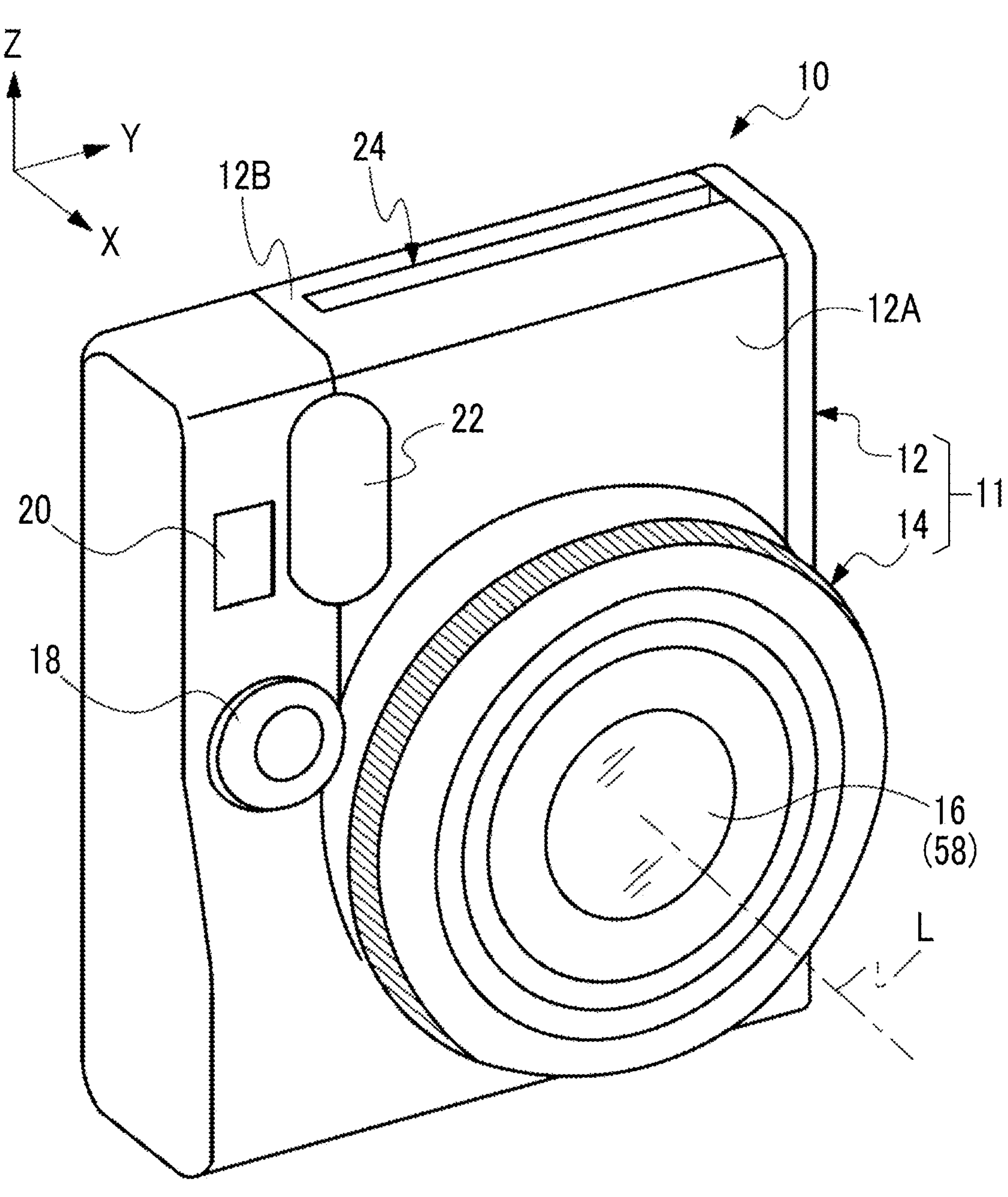
FIG. 1 is an external perspective view of an example of a configuration of a camera according to an embodiment.

In the following description, for convenience of description, a front-rear direction (also referred to as depth direction), a width direction, and a height direction of a camera 10 are indicated by three arrows X, Y, and Z. First, the height direction is indicated by the arrow Z, an arrow Z direction indicated by the arrow Z is an upper direction of the camera 10, and an opposite direction thereof is a lower direction. The width direction is indicated by the arrow Y perpendicular to the arrow Z, a direction indicated by the arrow Y is a right direction of the camera 10, and an opposite direction thereof is a left direction. The front-rear direction is indicated by the arrow X perpendicular to the arrow Z and the arrow Y, a direction indicated by the arrow X is a front direction of the camera 10, and an opposite direction thereof is a rear direction. That is, a direction toward a subject in the camera 10 is the front direction. Further, in the following, expressions using sides such as an upper side, a lower side, a left side, a right side, a front side, and a rear side have the same meanings as the expressions using the directions. As shown in FIG. 1 as an example, the camera 10 is an imaging apparatus that can image the subject. The camera 10 is, for example, an instant camera capable of recording a subject image on an instant film loaded inside a housing 11. The camera 10 is an example of "imaging apparatus" according to the technique of the present disclosure. Various configurations, components, and the like used for the imaging of the subject by the camera 10 can be accommodated in the housing 11. The housing 11 is an example of "housing" according to the technique of the present disclosure. The housing 11 comprises a housing body 12 and a lens barrel 14. The housing body 12 is a housing having a substantially rectangular parallelepiped shape, and the lens barrel 14 is provided on a front surface 12A of the housing body 12. The lens barrel 14 comprises an optical system 58 (refer to FIG. 10) including an objective lens 16 and can be expanded and contracted along an optical axis L. The housing body 12 is an example of "housing body" according to the technique of the present disclosure.

Further, a release button 18, an opening window 20, and a strobe 22 are provided on the front surface 12A of the housing body 12. The release button 18 is a button that can be pressed by a user. In a case where the release button 18 is pressed, an imaging operation of the camera 10 is started. The opening window 20 is an opening for the user to check the subject from a rear surface 12C side before the imaging. Further, the strobe 22 emits light to the subject under a condition designated by the user. Accordingly, an amount of subject light Lo (refer to FIG. 3 and the like) incident on a photosensitive surface 34A (refer to FIG. 3 and the like) is adjusted.

The form example has been described here in which the release button 18 is provided only on the front surface 12A, but this is merely an example. The release button 18 may also be provided on a left side surface of the housing body 12. In this case, the camera 10 can perform the imaging in a state shown in FIG. 1 and the imaging in a state rotated, from the state shown in FIG. 1, by 90 degrees clockwise as viewed from a front surface 12A side.

Further, a discharge port 24 is formed on an upper surface 12B of the housing body 12. The discharge port 24 is an opening for discharging, from the inside of the housing body 12, a film 34 (refer to FIG. 3 and the like) on which the subject image is recorded.

Figure 2:
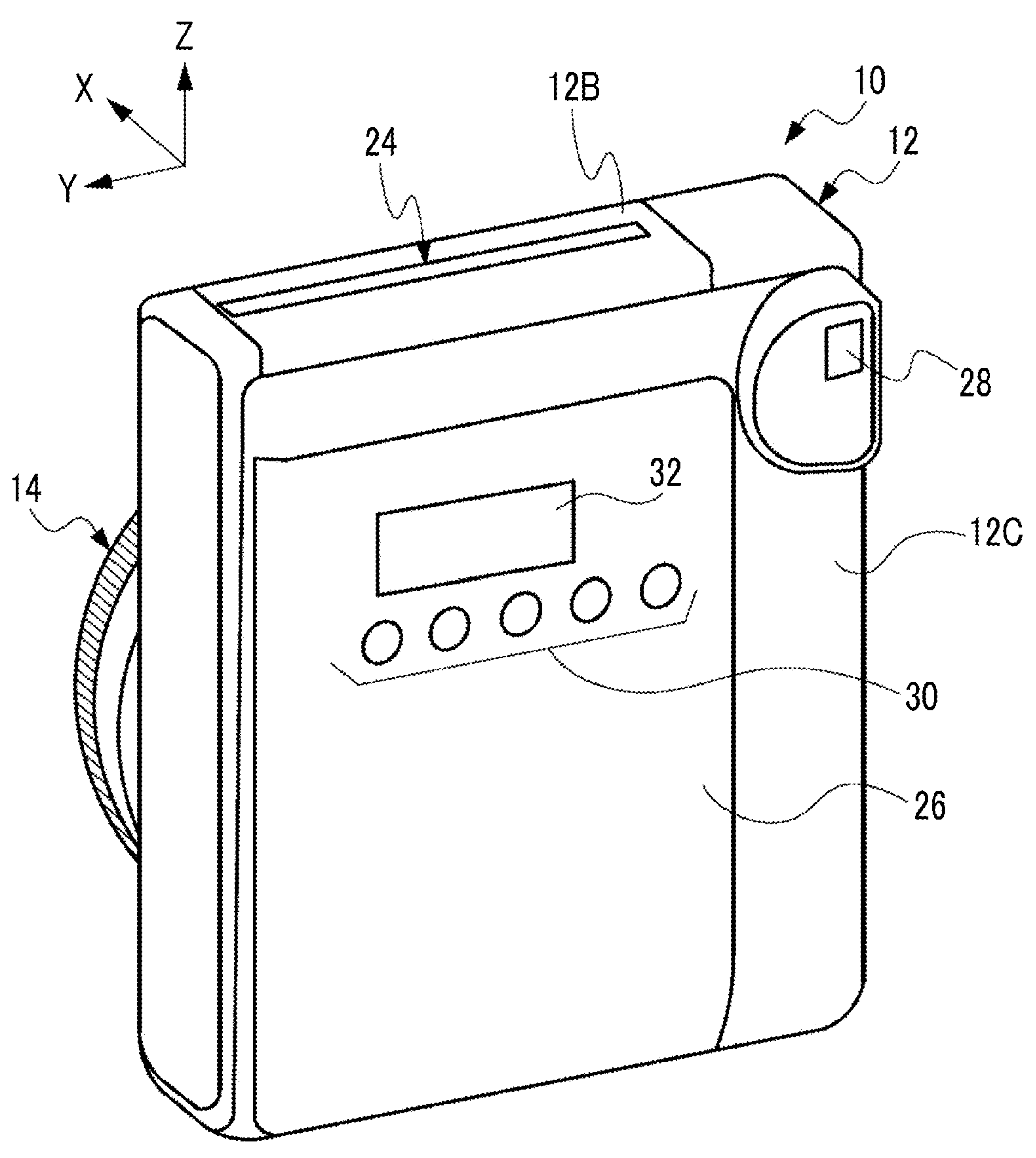
FIG. 2 is an external perspective view of the example of the configuration of the camera according to the embodiment.

As shown in FIG. 2 as an example, a cover 26 is provided on a rear surface 12C of the housing body 12. With opening of the cover 26, the inside of the housing body 12 is opened, and a cartridge 36 (refer to FIG. 4) having the film 34 inside the housing body 12 can be loaded. Further, the rear surface 12C is provided with a finder 28 corresponding to the opening window 20 of the front surface 12A.

A reception device 30 and a display device 32 are provided on the rear surface 12C of the housing body 12. The reception device 30 is a device that can receive various inputs from the user, and a plurality of buttons are shown in the example shown in FIG. 2. The reception device 30 is an example of "reception unit" according to the technique of the present disclosure. For example, the user presses a button to select and decide an imaging mode (for example, an effect mode which will be described below). Further, the display device 32 is a device that can display various types of information to the user. For example, the display device 32 is a liquid crystal display (LCD).

Figure 3:
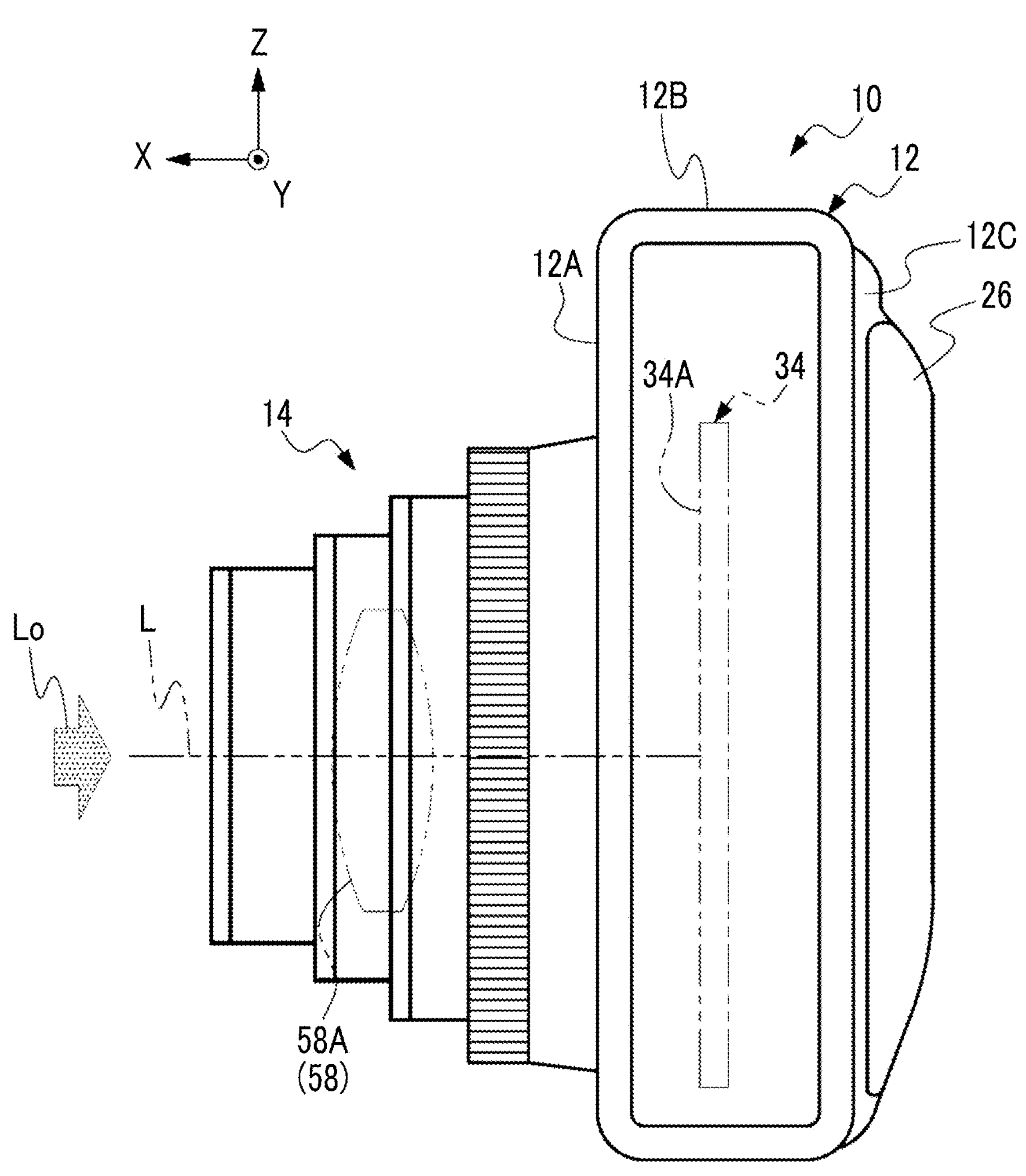
FIG. 3 is an external side surface view of the example of the configuration of a camera according to the embodiment.

As shown in FIG. 3 as an example, the camera 10 starts the imaging in a state where the lens barrel 14 is extended with respect to the housing body 12. The subject light Lo incident on the lens barrel 14 passes through an imaging lens 58A accommodated in the lens barrel 14 and forms an image on the photosensitive surface 34A of the film 34. A distance that the lens barrel 14 protrudes from the housing body 12 may be set according to the imaging mode or may be adjusted as appropriate by the user. Further, in a case where a power supply of the camera 10 is turned off or in a case where the imaging is not performed for a certain period of time, the lens barrel 14 is in a contracted state with respect to the housing body 12.

Figure 4:
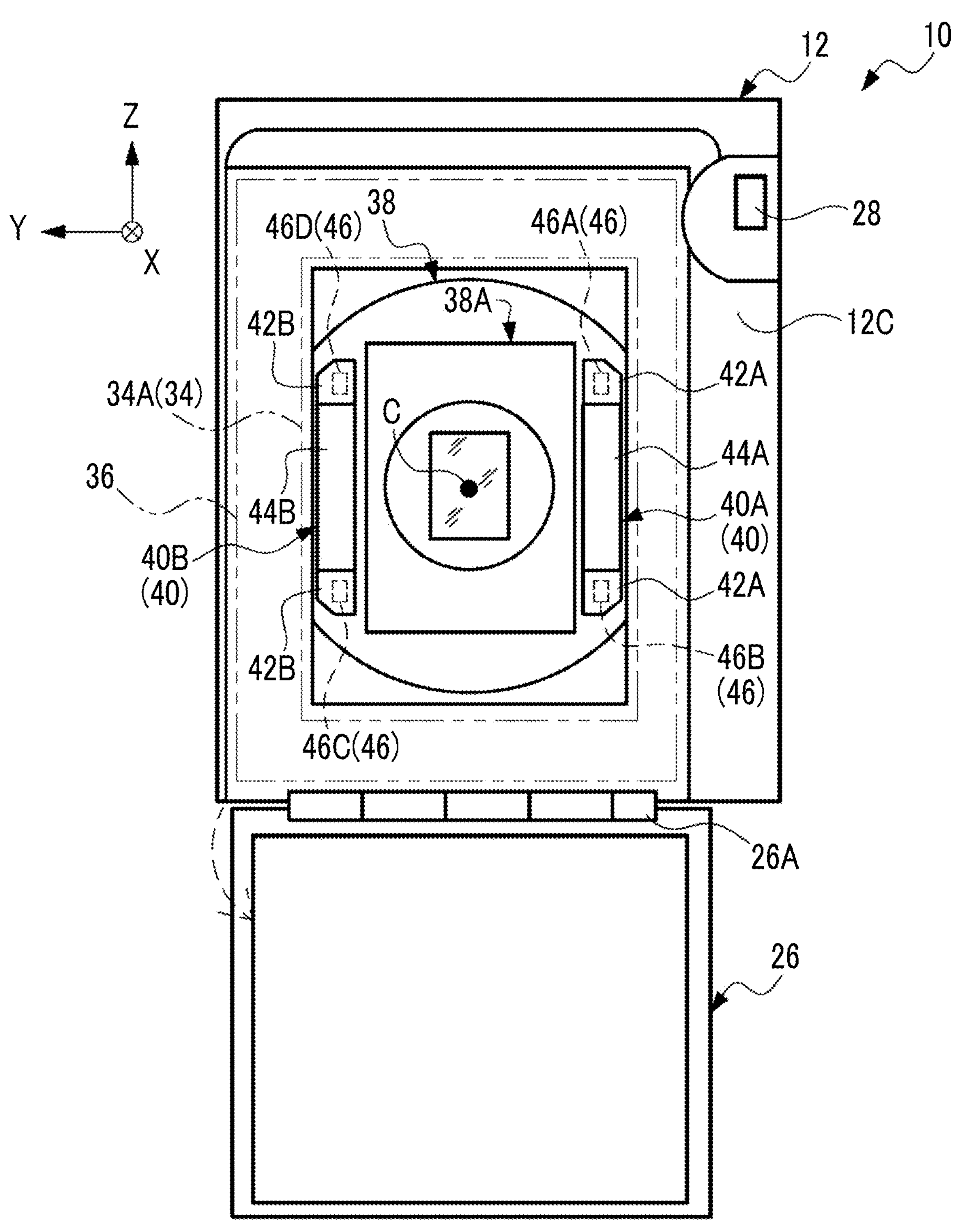
FIG. 4 is an external rear surface view of the example of the configuration of the camera according to the embodiment.

As shown in FIG. 4 as an example, with opening of the cover 26 of the rear surface 12C, the inside of the housing body 12 is exposed. In the example shown in FIG. 4, with rotational movement of the cover 26 via a hinge 26A, the cover 26 is opened. A rectangular space is formed inside the housing body 12 as viewed from an X direction, and the cartridge 36 is loaded into the space in the housing body 12. The cartridge 36 has a plurality of films 34. With load of the cartridge 36, the film 34 is also loaded inside the housing body 12. The photosensitive surface 34A (refer to also FIG. 3) is formed on a front surface of the film 34 in a state where the film 34 is loaded inside the housing body 12, and the subject image is recorded on the photosensitive surface 34A with exposure of the photosensitive surface 34A to the subject light Lo (refer to FIG. 3). The film 34 is a color film, and has, for example, three photosensitive layers that separately sense light of each color of blue (B), green (G), and red (R).

By the way, in a film camera known in the related art (for example, an instant camera), a subject image can be recorded on a photosensitive surface, but there is room for improvement in terms of imparting a visual effect desired by a user to the subject image. The visual effect refers to an effect that causes a visual change in the subject image, and the visual effect includes, for example, a tone effect or a brightness effect.

The tone effect is an effect of changing a tint of the subject light incident on the film 34 to add an intentional change to color development of the film 34, such as a color tone of the film 34. Examples of the tone effect include effect modes such as an effect A that changes the color development of the film 34 to the tint of a greenish nostalgic atmosphere, or an effect B that changes the color development of the film 34 to the tint having yellowish color unevenness. Further, the brightness effect is an effect of emitting light to the film 34, in addition to the subject light incident on the film 34, to add an intentional change to the brightness of the film 34. Examples of the brightness effect include making a part of the film 34 brighter than other parts or intentionally causing halation to occur.

In the film camera known in the related art, such a visual effect is realized by, for example, attaching an external filter imparted with a special tint to a lens of the camera. In a case where the visual effect is imparted to the subject image using the filter as described above, the filter needs to be prepared for each visual effect. Further, in a case where the visual effect is changed, the filter needs to be replaced each time.

In the camera 10 according to the present embodiment, a light source 46 is provided inside the housing body 12. That is, the camera 10 comprises the light source 46 built in the housing body 12. With the exposure of the photosensitive surface 34A to the subject light Lo in a superimposed manner, the light source 46 can emit, to the photosensitive surface 34A of the film 34, effect light that is light for imparting the visual effect to the subject image. The light source 46 is an example of "light source" according to the technique of the present disclosure.

In the following description, although a form example in which the tone effect is imparted as the visual effect will be described, it is needless to say that the technique of the present disclosure is similarly applicable to other visual effects (for example, brightness effect and an effect in which the brightness effect and the tone effect are combined).

A plurality of the light sources 46 are provided inside the housing body 12. In the example shown in FIG. 4, four light sources 46 are provided, and each of the light sources 46 is a light emitting diode (LED) light source comprising an LED as a light emitting element. The number of light sources 46 may be three or less, or five or more. In the following description, in a case where there is no need to distinguish between a first LED light source 46A, a second LED light source 46B, a third LED light source 46C, and a fourth LED light source 46D, the light sources may be simply referred to as "light source 46".

The four light sources of the first LED light source 46A, the second LED light source 46B, the third LED light source 46C, and the fourth LED light source 46D are shown here as the light source 46, but this is merely an example. Further, for example, an organic electro luminescence (EL) light source may be used as the light source 46.

The light source 46 is disposed, inside the housing body 12, symmetrically with respect to a center C of the photosensitive surface 34A of the film 34 in a case where the film 34 is viewed in plan view (in a case where the film 34 is viewed from the X direction shown in FIG. 4). Here, the expression "disposed symmetrically with respect to the center C" means being disposed at a position having rotation symmetry with respect to the center C or being disposed in line symmetry with respect to a straight line that passes through the center C and extends along a side of the photosensitive surface 34A. Further, in the present embodiment, the expression "disposed symmetrically" means being disposed at a symmetrical position in a sense including an error that is generally allowed in the technical field to which the technique of the present disclosure belongs and that does not go against the gist of the technique of the present disclosure, in addition to being disposed at a completely symmetrical position.

In the example shown in FIG. 4, the plurality of light sources 46 are disposed at positions that are in point symmetry with respect to the center C (that is, positions that are two-fold symmetrical). Further, from another viewpoint, the plurality of light sources 46 are disposed in line symmetry with respect to a straight line that passes through the center C and extends in a direction (Z direction shown in FIG. 4) along a long side of the photosensitive surface 34A.

Figure 5:
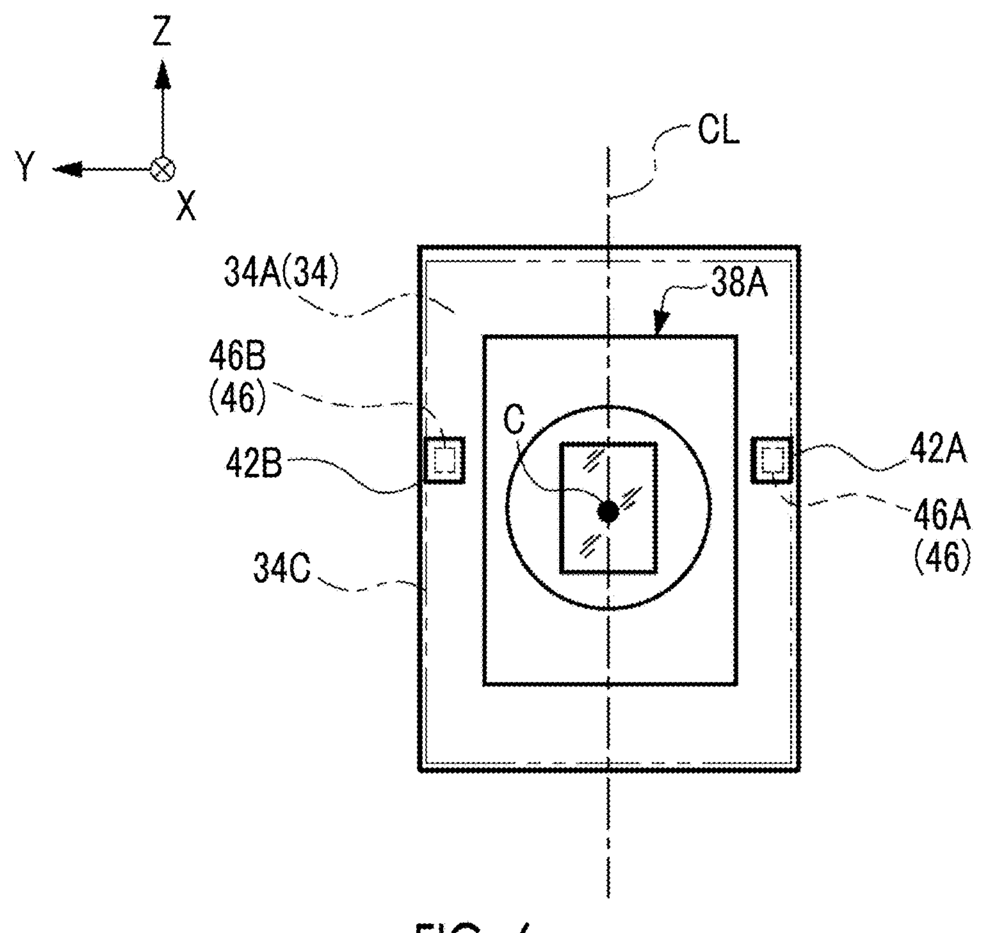
FIG. 5 is a conceptual diagram showing an example of disposition of a light source according to the embodiment.

Further, FIG. 5 shows a form example in which the plurality of light sources 46 are disposed in line symmetry. The example shown in FIG. 5 shows a straight line CL that passes through the center C of the photosensitive surface 34A and extends along the long side of the photosensitive surface 34A. The plurality of light sources 46 are disposed in line symmetry with respect to the straight line CL. Specifically, the light source 46A is disposed on a right side of the straight line CL as viewed from a paper surface side, and the light source 46B is disposed on a left side of the straight line CL as viewed from the paper surface side. The light source 46A and the light source 46B are positioned at corresponding places with the straight line CL interposed therebetween.

Figure 6:
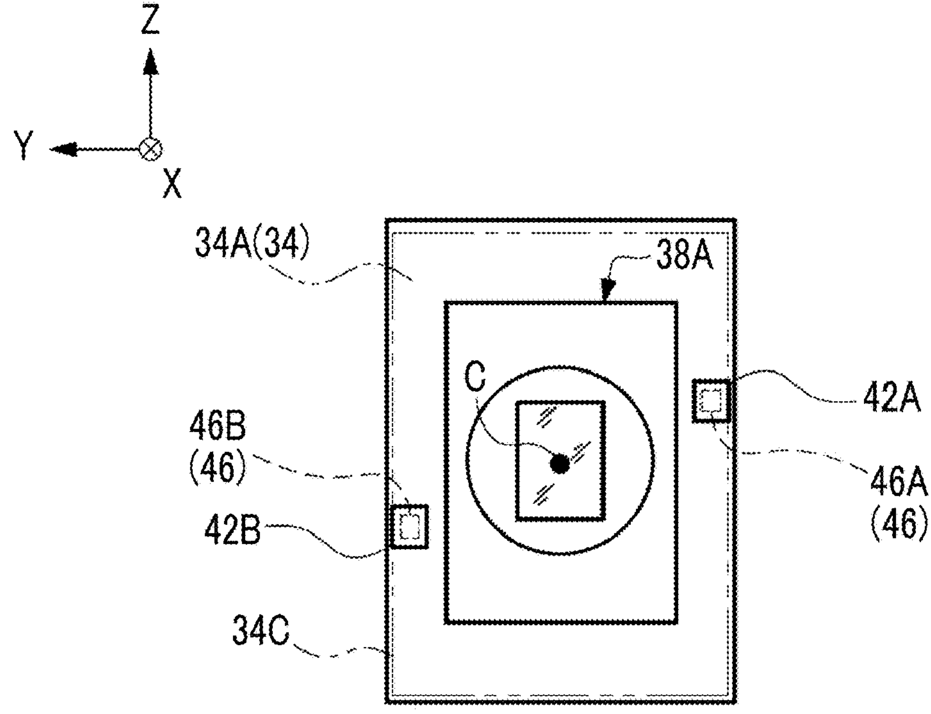
FIG. 6 is a conceptual diagram showing the example of disposition of the light source according to the embodiment.

Further, FIG. 6 shows a form example in which the plurality of light sources 46 are disposed in point symmetry. In an example shown in FIG. 6, the plurality of light sources 46 are disposed in point symmetry with respect to a center C of the photosensitive surface 34A. That is, in a case where the positions of the plurality of light sources 46 are virtually moved and rotated by 180 degrees with the center C as a rotation center as viewed from the paper surface side, the light source 46B after the rotation is positioned at a position of the light source 46A before the rotation. Further, the light source 46A after the rotation is positioned at the position of the light source 46B before the rotation.

FIGS. 5 and 6 show examples in which the plurality of light sources 46 are two, but the number of the plurality of light sources 46 is not particularly limited as described above. Further, the disposition of the plurality of light sources 46 is not particularly limited as long as the plurality of light sources 46 have the line symmetry or the rotation symmetry.

In the following description of the present embodiment, the disposition of the plurality of light sources 46 shown in FIG. 4 will be described as an example.

The light source 46 is provided in a frame member 38. The frame member 38 is provided at a position facing the film 34 in the lens barrel 14. The frame member 38 is formed of, for example, a hard resin. The frame member 38 is an example of "frame member" according to the technique of the present disclosure.

Figure 7:
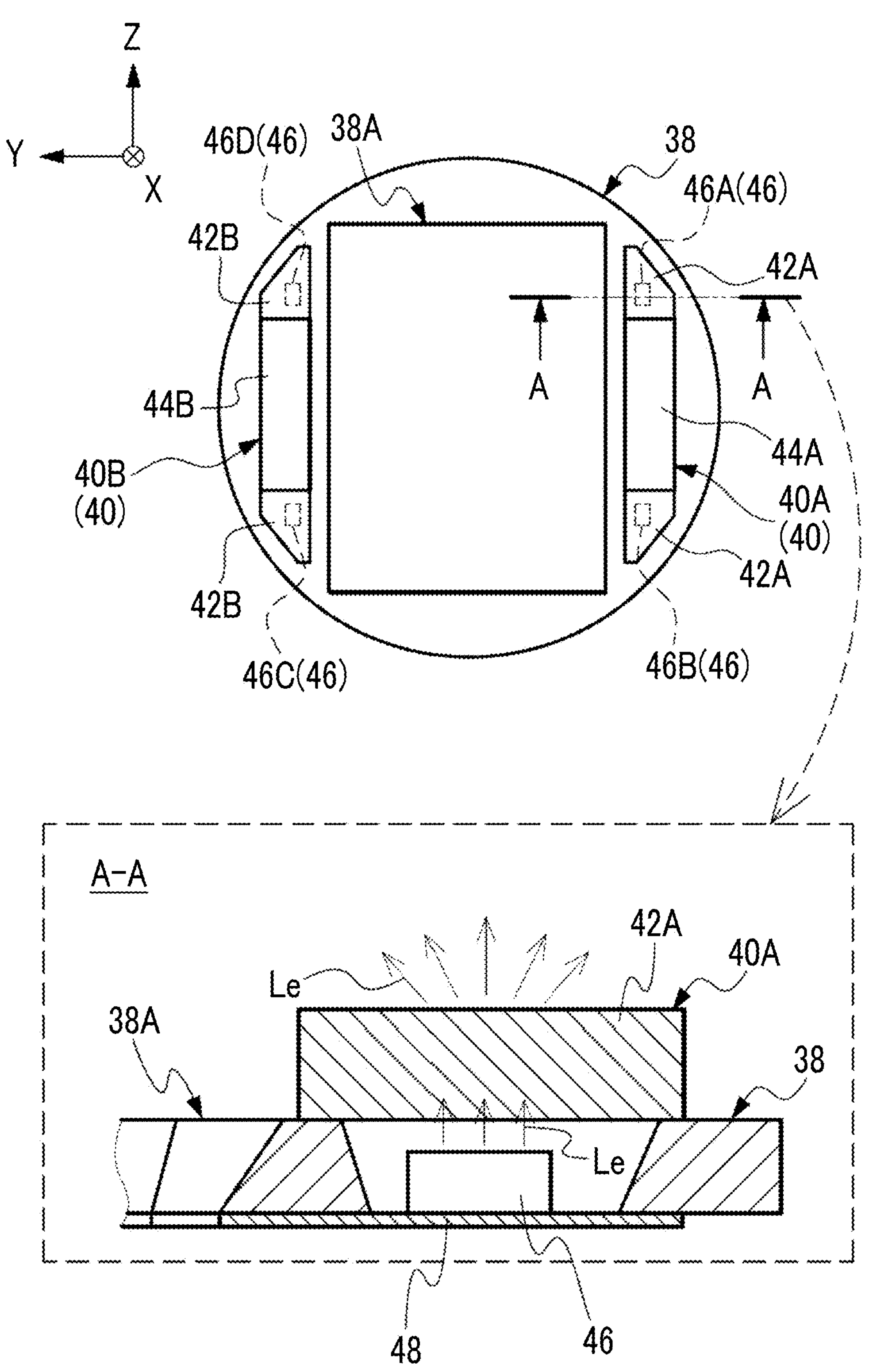
FIG. 7 is an external rear surface view of an example of a configuration of a frame member according to the embodiment.

As shown in FIG. 7 as an example, the frame member 38 is a frame-shaped member having a circular outer shape and having an exposure aperture 38A formed on an inner peripheral side thereof. The subject light Lo passes through the exposure aperture 38A and reaches the photosensitive surface 34A. In other words, the exposure aperture 38A is provided at a position facing the photosensitive surface 34A. The exposure aperture 38A is an example of "exposure aperture" according to the technique of the present disclosure.

Further, the light source 46 is provided around the exposure aperture 38A in the frame member 38. Since the frame member 38 is provided inside the lens barrel 14, the exposure aperture 38A is provided in the lens barrel 14 and the light source 46 is provided around the exposure aperture 38A.

Further, the frame member 38 is provided with a diffusion member 40. The diffusion member 40 causes effect light Le emitted from the light source 46 to diffuse. The diffusion member 40 is attached to a surface on a rear side of the frame member 38 (that is, a surface on a film 34 side). The diffusion member 40 is an example of "diffusion member" according to the technique of the present disclosure.

In the example shown in FIG. 7, a pair of diffusion members 40A and 40B are shown as the diffusion members 40. A light shielding member 44A is attached to the diffusion member 40A. Further, a light shielding member 44B is attached to the diffusion member 40B. In the following description, although the diffusion member 40A will be described as an example, the diffusion member 40B also has the same configuration and function.

In a cross-sectional view taken along a line A-A shown in FIG. 7, the light source 46 is implemented on a substrate 48, and the effect light Le is emitted from the light source 46 which has been supplied with electric power from a power supply system (not shown). The effect light Le emitted from the light source 46 is diffused by the diffusion member 40A. Here, the diffusion member 40A is a milky-white resin member, and a surface of the diffusion member 40A is subjected to roughening treatment (for example, blasting treatment). Accordingly, the effect light Le incident into the diffusion member 40A travels while being scattered inside a diffusion part 42A of the diffusion member 40A, and is diffused and emitted on the surface of the diffusion member 40A. As a result, the effect light Le diffused by the diffusion member 40A is emitted to the photosensitive surface 34A.

Figure 8:
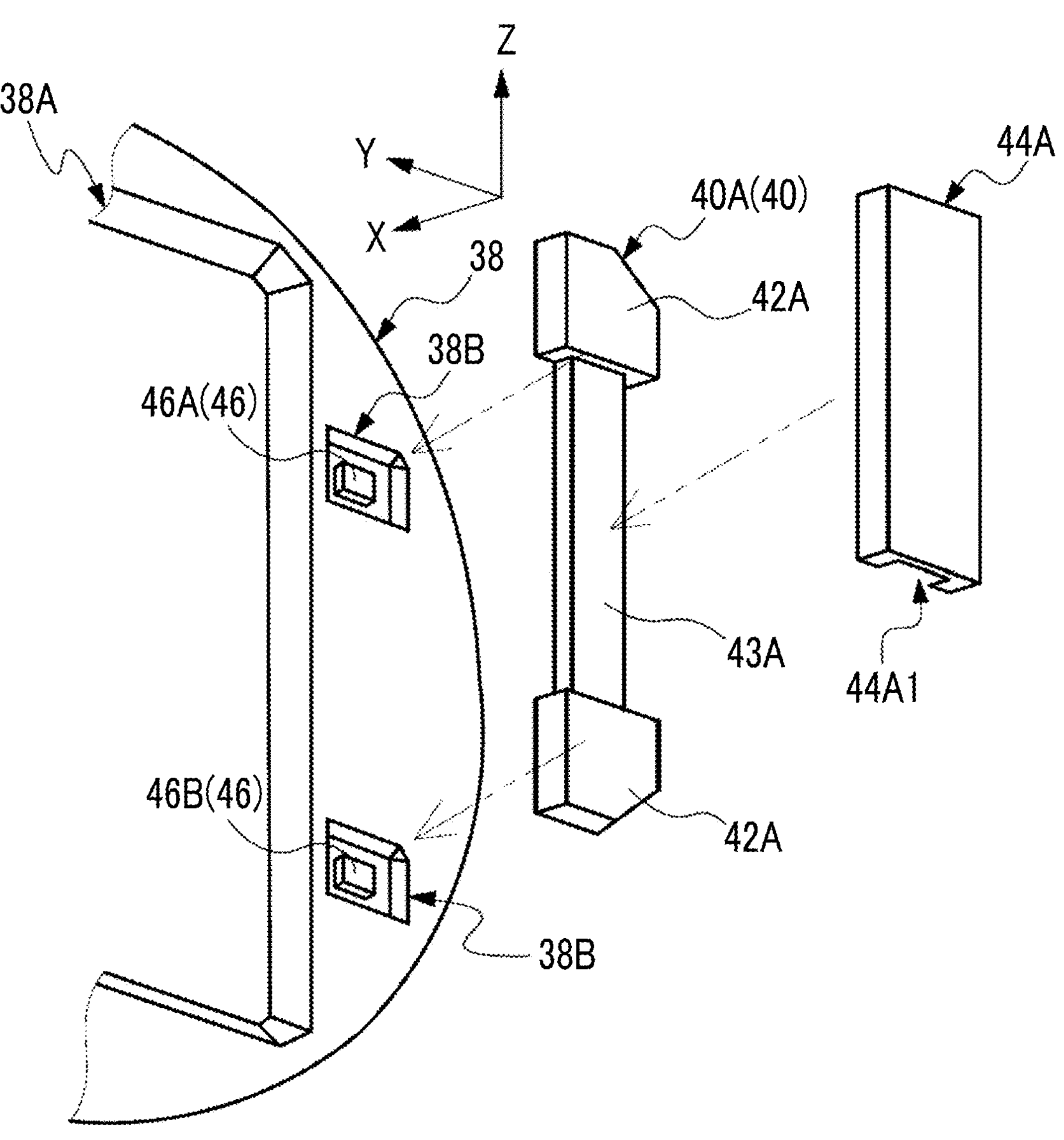
FIG. 8 is an exploded perspective view of the example of the configuration of the frame member according to the embodiment.

As shown in FIG. 8 as an example, the diffusion member 40A comprises a pair of diffusion parts 42A and a coupling part 43A that couples the pair of diffusion parts 42A. Further, the light shielding member 44A that covers the coupling part 43A is attached to the diffusion member 40A. The pair of diffusion parts 42A is an example of "diffusion part" according to the technique of the present disclosure, the coupling part 43A is an example of "coupling part" according to the technique of the present disclosure, and the light shielding member 44 is an example of "light shielding member" according to the technique of the present disclosure.

The pair of diffusion parts 42A is provided at a position facing the light source 46. Specifically, one diffusion part 42A is provided in the frame member 38 at a position covering a recess portion 38B in which the first LED light source 46A is accommodated. Further, the other diffusion part 42A is provided at a position covering the recess portion 38B in which the second LED light source 46B is accommodated. The coupling part 43A is a portion that extends between the pair of the diffusion parts 42A and that couples the diffusion parts 42A. The coupling part 43A is connected to the pair of diffusion parts 42A. For example, the coupling part 43A is integrally molded with the pair of diffusion parts 42A. In the example shown in FIG. 8, the coupling part 43A extends along the Z direction. The example has been described here in which the coupling part 43A is integrally molded with the pair of diffusion parts 42A, but this is merely an example. For example, the coupling part 43A and the pair of diffusion parts 42A may be connected by being joined (for example, ultrasonic welding).

The light shielding member 44A is a member that shields the effect light Le leaking from the coupling part 43A toward the photosensitive surface 34A. That is, in the diffusion member 40A, a part of the effect light Le propagates from the diffusion part 42A to the coupling part 43A. Accordingly, the effect light Le may leak from the coupling part 43A toward the photosensitive surface 34A.

The light shielding member 44A is used to shield the effect light Le leaking from the coupling part 43A. In the example shown in FIG. 8, the light shielding member 44A covers the coupling part 43A from a rear side (that is, film 34 side). The light shielding member 44A has a groove portion 44A1 having a rectangular parallelepiped shape and extending along the Z direction on a surface on a coupling part 43A side. With fitting of the coupling part 43A into the groove portion 44A1, the light shielding member 44A covers the coupling part 43A.

As shown in FIG. 9 as an example, an extra length processing structure 50 is provided inside the camera 10. The extra length processing structure 50 is a structure for accommodating an extra length portion of a wiring part 48A inside the camera 10 in a case where the wiring part 48A extending from the substrate 48 is extra. Here, the wiring part 48A is a cable-like portion that electrically connects the substrate 48 on which the light source 46 is implemented and the power supply system provided in the housing body 12 of the camera 10. That is, the wiring part 48A extends between the frame member 38 and the housing body 12. As shown in an upper part of FIG. 9, in a case where the lens barrel 14 is extended, the frame member 38 provided in the lens barrel 14 is located at a position away from the lens barrel 14, and thus there is a state where the wiring part 48A has no extra length portion.

As shown in a lower part of FIG. 9, in a case where the lens barrel 14 is housed in the housing body 12, a distance between the frame member 38 and the housing body 12 becomes short as compared with a case where the lens barrel 14 is extended. As a result, the wiring part 48A may have the extra length portion. The extra length portion of the wiring part 48A is accommodated by the extra length processing structure 50.

The extra length processing structure 50 includes a first portion 52, a second portion 54, and a third portion 56. The first portion 52 and the second portion 54 are plate-shaped portions that are erected from a front surface of the frame member 38. The first portion 52 and the second portion 54 are provided at positions facing each other in a Y direction, and a gap is formed between the first portion 52 and the second portion 54. The third portion 56 is a plate-shaped portion of which one end is attached to the lens barrel 14 and the other end is insertable into the gap between the first portion 52 and the second portion 54.

In a case where the lens barrel 14 is moved in a direction (that is, rear direction) in which the lens barrel 14 is housed in the housing body 12, the third portion 56 moves toward the between the first portion 52 and the second portion 54 accompanying the movement of the lens barrel 14. In a case where the other end of the third portion 56 comes into contact with the wiring part 48A, the wiring part 48A is accommodated while being folded between the first portion 52 and the second portion 54.

In a state where the wiring part 48A is accommodated, the wiring part 48A extending from the substrate 48 is first folded back by the second portion 54. Next, the wiring part 48A is folded back at the other end of the third portion 56. The wiring part 48A is folded back by the first portion 52. In this manner, the wiring part 48A is folded by the extra length processing structure 50. Accordingly, since the wiring part 48A is accommodated in the extra length processing structure 50, even in a case where the lens barrel 14 is moved with respect to the housing body 12, the wiring part 48A is prevented from interfering with other portions inside the camera 10 or being caught thereinside.

Further, the wiring part 48A is subjected to surface treatment (for example, black coating) for suppressing reflection of the subject light Lo incident into the inside of the camera 10. Accordingly, unintended exposure of the photosensitive surface 34A is suppressed.

Next, a hardware configuration of the electric system of the camera 10 according to the present embodiment will be described. As shown in FIG. 10 as an example, the camera 10 comprises a control device 60. The control device 60 controls an overall operation of the camera 10. The control device 60 comprises a processor 62, a random access memory (RAM) 64, a storage 66, and an external interface (I/F) 68. The processor 62, the RAM 64, the storage 66, and the external I/F 68 are connected to a bus 70. The processor 62 is an example of "processor" according to the technique of the present disclosure.

A memory is connected to the processor 62. The memory includes the storage 66 and the RAM 64. The processor 62 has, for example, a central processing unit (CPU). The processor 62 may be provided with a graphics processing unit (GPU) dedicated to image processing, separately from the CPU.

The RAM 64 is a memory where information is temporarily stored, and is used as a work memory by the processor 62. An example of the RAM 64 includes a dynamic random access memory (DRAM) or a static random access memory (SRAM).

The storage 66 is a nonvolatile storage device that stores various programs, various parameters, and the like. Examples of the storage 66 include a flash memory (for example, an electrically erasable and programmable read only memory (EEPROM) and a solid state drive (SSD)), and/or a hard disk drive (HDD). The flash memory and the HDD are merely an example, and at least one of the flash memory, an HDD magnetoresistive memory, or a ferroelectric memory may be used as the storage 66.

The external I/F 68 is responsible for exchanging various types of information with devices present outside the control device 60. The external I/F 68 is communicably connected to a shutter 61, the strobe 22, the light source 46, and the reception device 30.

The light source 46 can emit a plurality of types of effect light Le for obtaining different types of tone effects, according to setting of the parameter. Specifically, as described above, the camera 10 comprises, as the light source 46, the first LED light source 46A, the second LED light source 46B, the third LED light source 46C, and the fourth LED light source 46D. The first LED light source 46A is configured of a red (R) light emitting element 47A, a green (G) light emitting element 47B, and a blue (B) light emitting element 47C. With a change in the parameter setting related to the light emission of each light emitting element of the first LED light source 46A, a light amount and an emitted light color of the first LED light source 46A are adjusted.

Further, the second LED light source 46B is similarly configured of the red (R) light emitting element 47A, the green (G) light emitting element 47B, and the blue (B) light emitting element 47C. Furthermore, although not shown, the third LED light source 46C and the fourth LED light source 46D are also configured of the red (R) light emitting element, the green (G) light emitting element, and the blue (B) light emitting element. In the following description, in a case where there is no need to distinguish between the red (R) light emitting element 47A, the green (G) light emitting element 47B, and the blue (B) light emitting element 47C, the light emitting elements may be simply referred to as "light emitting element 47". The light emitting element 47 is an example of "light emitting element" according to the technique of the present disclosure, and the red (R) light emitting element 47A, the green (G) light emitting element 47B, and the blue (B) light emitting element 47C are examples of "light emitting elements of a plurality of colors" according to the technique of the present disclosure.

With a change in the setting of the parameter of the light emitting element 47, the light amounts and the emitted light colors of the second LED light source 46B to the fourth LED light source 46D are adjusted also for the second LED light source 46B to the fourth LED light source 46D. As a result of the adjustment of the light amounts and the emitted light colors of the first LED light source 46A to the fourth LED light source 46D, the effect light Le is emitted from the light source 46.

The light emitting element 47 is an LED that performs pulse light emission according to a driving pulse which is periodically input. An example of the parameter of the light emitting element 47 includes a light emission time that is decided by a duty ratio of the driving pulse and/or a repetition number of the driving pulse.

Further, the camera 10 comprises an optical system 58 and a driver 57. The driver 57 is communicably connected to the external I/F 68, and the driver 57 drives the optical system 58 with power generated under the control of the processor 62. The optical system 58 is an optical system for imaging the subject, and is configured by including a plurality of lens groups including the imaging lens 58A, and a stop.

In the camera 10, in a case where the tone effect is imparted to the subject image by using the light source 46, a light emission operation of the light source 46 needs to be controlled according to designation of the tone effect from the user. In view of such circumstances, in the camera 10 according to the present embodiment, the processor 62 reads out a control program 66A from the storage 66 and executes the readout control program 66A on the RAM 64, in the control device 60. Accordingly, the processor 62 operates as an acquisition unit 62A and a light source control unit 62B. The control program 66A is an example of "program" according to the technique of the present disclosure.

As shown in FIG. 11 as an example, the reception device 30 receives the designation of a type of the tone effect (for example, designation of the effect mode) from the user. In the camera 10, the example has been described here in which the type of the tone effect is set in advance as the effect mode, but this is merely an example. The type of the tone effect may be set or changed by the user. In a case where the designation of the type of the tone effect from the user is received, the reception device 30 outputs, to the processor 62, effect specification information 72, which is information capable of specifying the type of the tone effect. The effect specification information 72 is an example of "effect specification information" according to the technique of the present disclosure.

In the processor 62, the acquisition unit 62A acquires the effect specification information 72 from the reception device 30. The acquisition unit 62A outputs the effect specification information 72 to the light source control unit 62B.

The light source control unit 62B acquires the effect specification information 72 from the acquisition unit 62A. Further, the light source control unit 62B executes control of setting the parameter of the light source 46 according to the type of the tone effect indicated by the effect specification information 72. Specifically, the light source control unit 62B acquires a setting table 66B from the storage 66. The setting table 66B is a table in which the effect mode is used as input information and the parameter of a light emission condition of the light source 46 is used as output information.

In the example shown in FIG. 11, in a case where the effect A or the effect B as the effect mode is the input information in the setting table 66B, the parameters of the first LED light source 46A and the second LED light source 46B of each effect mode are shown as the output information. The parameters include the duty ratio (a ratio between a pulse width W and a pulse interval S shown in FIG. 11) of the driving pulse of each of the red (R), green (G), and blue (B) light emitting elements 47 constituting the light source 46 and a total light emission time T of each of the respective light sources 46. Although not shown, the parameter corresponding to the effect mode is similarly held in the setting table 66B for the third LED light source 46C and the fourth LED light source 46D. Although not shown, the parameter for the effect mode other than the effect A and the effect B is also held in the setting table 66B.

An example of the other effect mode includes changing to a tint of a gentle atmosphere with the subject image of a pale blueness, reproduction of light leakage with partial change of the emitted light color to a bright color, or addition of a gradation of a different color to the subject image.

The light source control unit 62B reads out the parameter of the light source 46 based on the effect specification information 72 by using the setting table 66B. Specifically, the parameter of the light source 46 corresponding to the effect mode indicated by the effect specification information 72 is read out. The light source control unit 62B executes the setting of the readout parameter of the light source 46. Specifically, the duty ratios of the driving pulses of the light emitting elements 47 of red (R), green (G), and blue (B) constituting each light source 46 are set, and the total light emission time T of each light source 46 is set.

With the adjustment of the duty ratio of the driving pulse of the light emitting element 47 of each color means adjustment of an emitted light amount per unit time of the light emitting element 47 of each color. With a combination of the emitted light amounts of the light emitting elements 47 of respective colors, it is possible to create light of various colors as the light source 46, which is a set of the light emitting elements 47 of respective colors.

For example, in a case where the emitted light amount of the light emitting element 47 of red (R) is relatively increased, the light of the light source 46 has an increased redness. In a case where the emitted light amount of the light emitting element 47 of blue (B) is relatively increased, the light of the light source 46 has an increased blueness. With equalization of the emitted light amount of each light emitting element 47, the light of the light source 46 becomes white light. Further, with turning-on of only the light emitting elements 47 of red (R) and green (G) with the same emitted light amount while turning-off of the light emitting element 47 of blue (B), the light source 46 can create yellow light. Further, with fine adjustment of the emitted light amount of the light emitting element 47 of each color, it is possible to create light of more various colors. Furthermore, with the emission of light of different colors in the plurality of light sources 46, it is possible to change the color for each region of each light source 46. In this manner, in the light source 46, with the adjustment of the light amount ratios of the light emitted from the light emitting elements 47 of red (R), green (G), and blue (B) and with the change in the emitted light color in each light source 46, it is possible to emit the plurality of types of effect light Le.

The form example has been described here in which the parameter is set by using the setting table 66B, but this is merely an example. Instead of the setting table 66B, a parameter derivation expression (not shown) in which the setting table 66B is represented as a function may be used to set the parameter. The parameter derivation expression is a calculation expression in which a value indicating the effect mode is used as an independent variable and a value of the parameter is used as a dependent variable.

Figure 12:
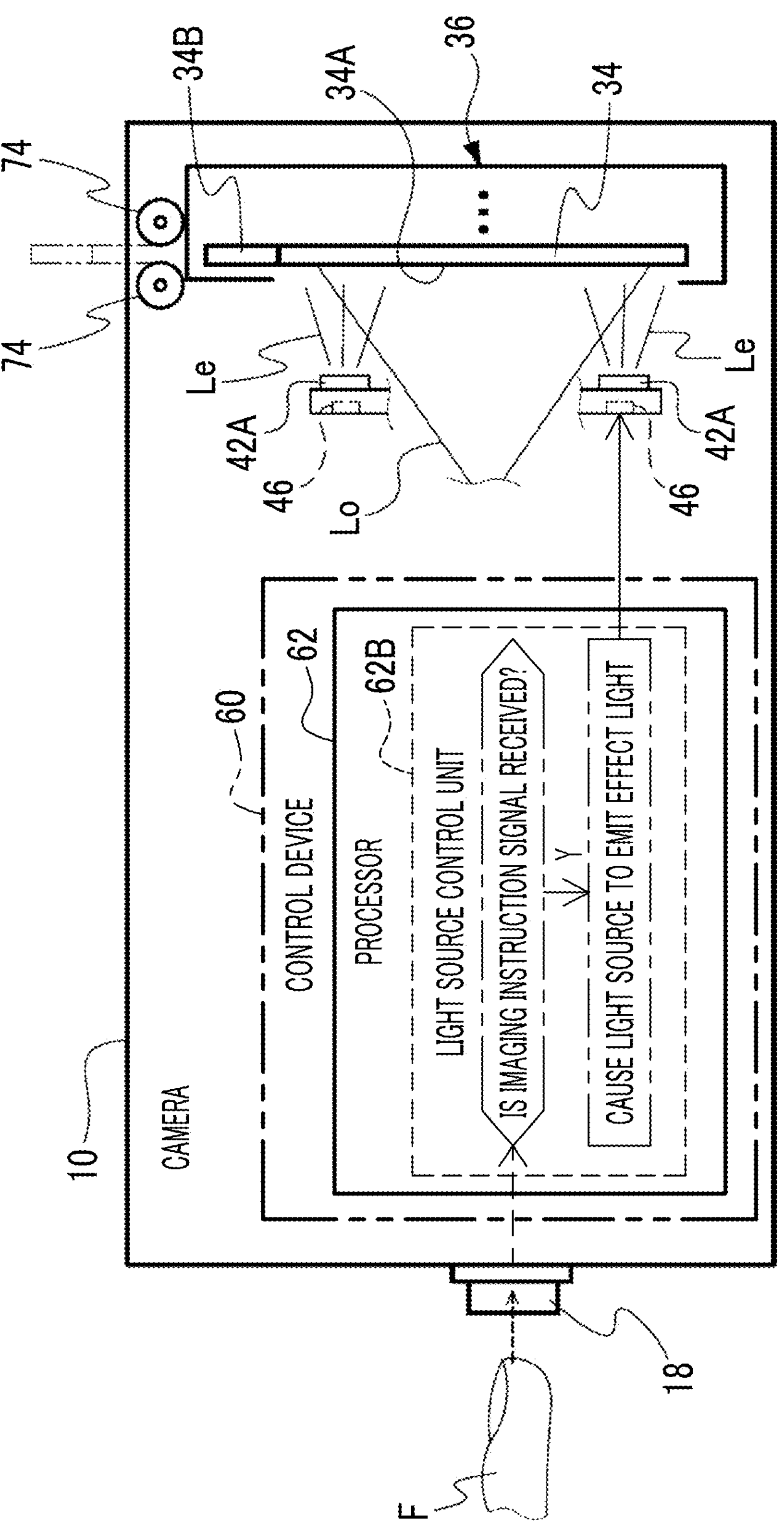
FIG. 12 is a conceptual diagram showing an example of a main function of a processor of the camera according to the embodiment.

As shown in FIG. 12 as an example, the subject is imaged by pressing the release button 18 with a finger F of the user. That is, with the exposure of the photosensitive surface 34A of the film 34 to the subject light Lo, the subject image is recorded on the film 34.

Further, in the processor 62, the light source control unit 62B determines whether or not an imaging instruction signal output in a case where the release button 18 is pressed is received. In a case where the determination is affirmative, the light source control unit 62B causes the light source 46 to emit the effect light Le. As described above, the parameter is set according to the effect mode in the light source 46. Therefore, the effect light Le is emitted from the light source 46 toward the photosensitive surface 34A of the film 34 with the parameter corresponding to the effect mode. The diffusion part 42A diffuses the effect light Le and then the photosensitive surface 34A is exposed to the effect light Le. As a result, the tone effect is imparted to the subject image by the effect light Le. The photosensitive surface 34A is an example of "photosensitive surface" according to the technique of the present disclosure. The effect light Le is an example of "effect light" according to the technique of the present disclosure, and the subject light Lo is an example of "subject light" according to the technique of the present disclosure.

The film 34 after the imaging is finished is discharged from the cartridge 36. In a case where the film 34 is discharged from the cartridge 36, a developer 34B sealed in the film 34 is applied to the photosensitive surface 34A. The developer 34B develops a latent image recorded on the photosensitive surface 34A. Specifically, in a case where the film 34 is discharged by a pair of rolls for discharge 74 provided in the camera 10, the developer 34B is pushed onto the photosensitive surface 34A and thus is applied to the exposed photosensitive surface 34A. The developer 34B is an example of "developer" according to the technique of the present disclosure.

Figure 13:
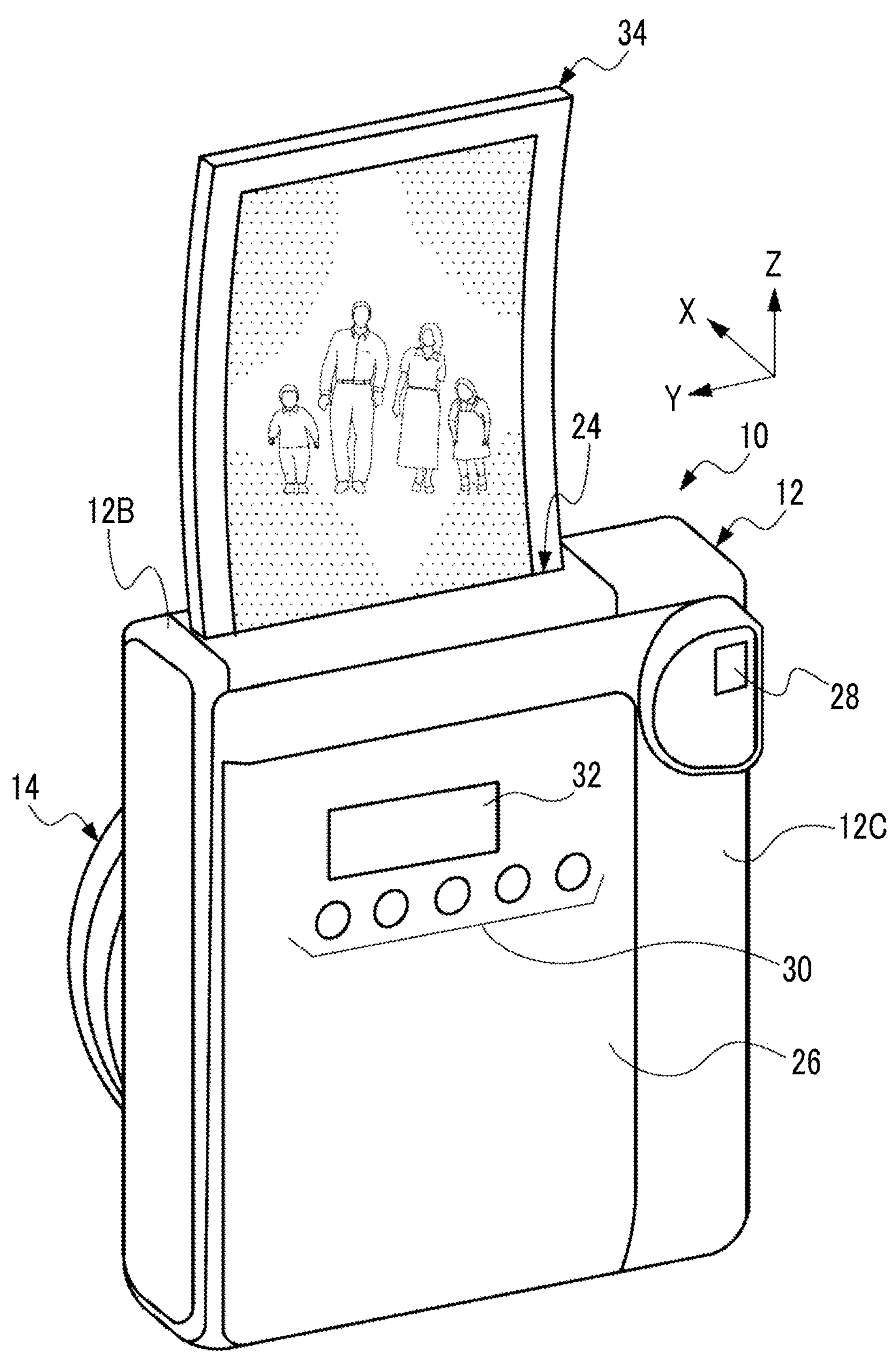
FIG. 13 is an external perspective view of an example of an operation of the camera according to the embodiment.

As shown in FIG. 13 as an example, the film 34 is discharged from the camera 10. The tone effect is imparted to the subject image recorded on the film 34. With visual recognition of the subject image to which the tone effect is imparted, the user can enjoy a visual performance effect on the subject image. In the example shown in FIG. 13, with the exposure of four corners indicated by hatching around the subject image (here, a group photo of persons) recorded on the film 34 to the effect light Le that changes the color tone and the subject light Lo in a superimposed manner, the tone effect is imparted to the subject image.

Figure 14:
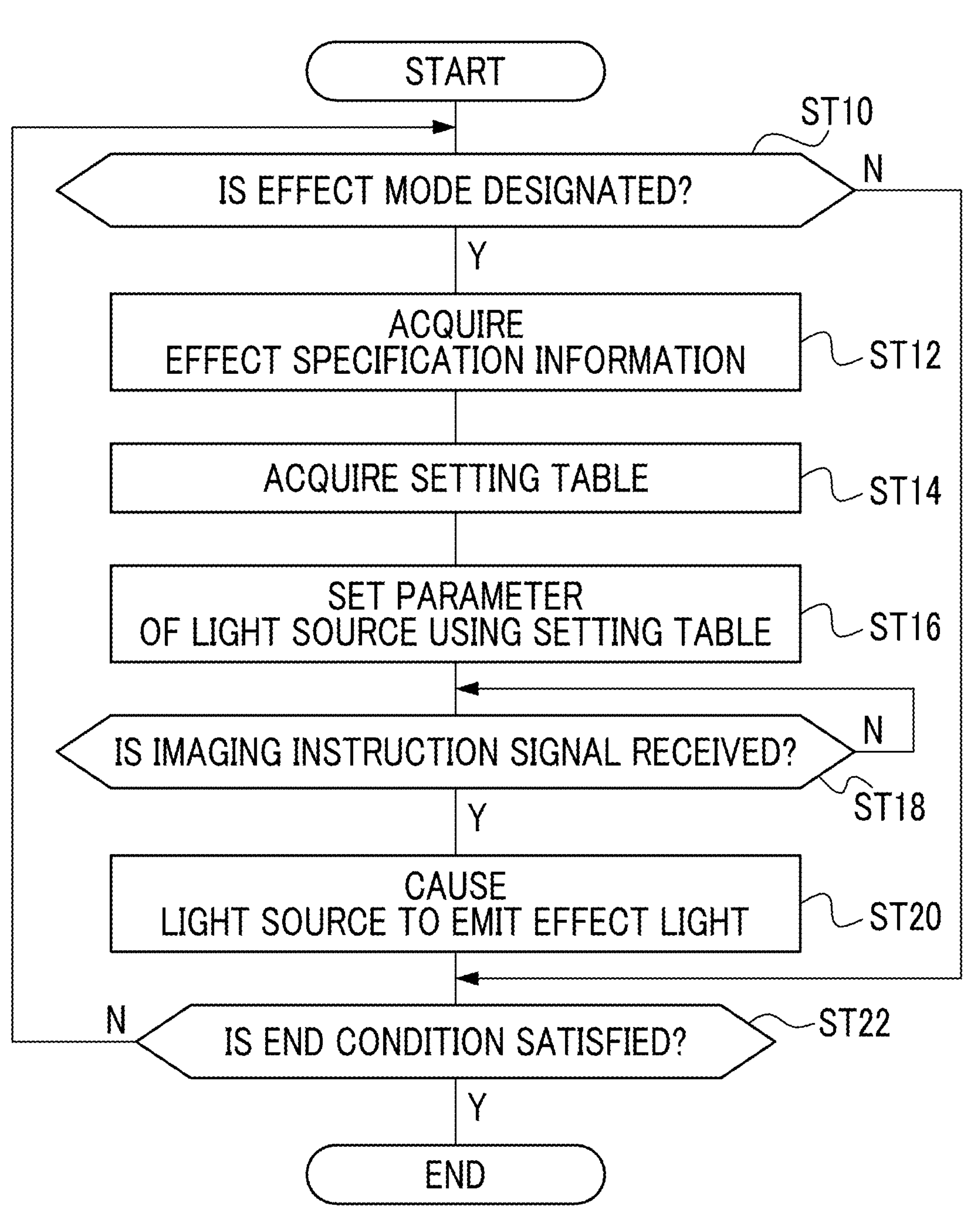
FIG. 14 is a flowchart showing an example of light source control processing according to the embodiment.

Next, light source control processing in the camera 10 according to the present embodiment will be described with reference to FIG. 14. FIG. 14 is a flowchart showing an example of the light source control processing. A flow of the light source control processing shown in FIG. 14 is an example of "control method" according to the technique of the present disclosure.

In the light source control processing shown in FIG. 14 as an example, first, in step ST10, the acquisition unit 62A determines whether or not the effect mode is designated. In step ST10, in a case where the effect mode is designated, affirmative determination is made, and the light source control processing proceeds to step ST12. In step ST10, in a case where the effect mode is not designated, negative determination is made, and the light source control processing proceeds to step ST22.

In step ST12, the acquisition unit 62A acquires the effect specification information 72 that can specify the effect mode input via the reception device 30. After the processing of step ST12 is executed, the light source control processing proceeds to step ST14.

In step ST14, the light source control unit 62B acquires the setting table 66B from the storage 66. After the processing of step ST14 is executed, the light source control processing proceeds to step ST16.

In step ST16, the light source control unit 62B executes the setting of the parameter of the light source 46 corresponding to the effect mode indicated by the effect specification information 72, by using the setting table 66B acquired in step ST14. After the processing of step ST16 is executed, the light source control processing proceeds to step ST18.

In step ST18, the light source control unit 62B determines whether or not the imaging command signal from the user is received. In step ST18, in a case where the imaging instruction signal from the user is received, affirmative determination is made, and the light source control processing proceeds to Step ST20. In step ST18, in a case where the imaging instruction signal from the user is not received, negative determination is made, and the light source control processing proceeds to step ST18 again.

In step ST20, the light source control unit 62B causes the light source 46 to emit the effect light Le. After the processing of step ST20 is executed, the light source control processing proceeds to step ST22.

In step ST22, the light source control unit 62B determines whether or not a condition (hereinafter referred to as "end condition") for ending the light source control processing is satisfied. An example of the end condition includes a condition that the reception device 30 receives an instruction to end the light source control processing. In step ST22, in a case in which the end condition is not satisfied, negative determination is made, and the light source control processing proceeds to step ST10. In step ST22, in a case where the end condition is satisfied, affirmative determination is made, and the light source control processing ends.

As described above, the camera 10 according to the present embodiment is loaded with the film 34 on which the subject image is recorded, inside the housing body 12. The photosensitive surface 34A of the film 34 is exposed to the subject light Lo. The light source 46 capable of emitting the effect light Le to the photosensitive surface 34A is provided inside the housing body 12. With the exposure of the photosensitive surface 34A to the effect light Le and the subject light Lo in a superimposed manner, the tone effect is imparted to the subject image. In a case where the subject is imaged, with the emission of the effect light Le that imparts the tone effect and the subject light Lo in a superimposed manner to the film 34, it is possible to impart the tone effect to the subject image.

For example, in a configuration in which an external filter is attached to the camera to impart the tone effect to the subject image, a separate component such as the external filter needs to be prepared for each tone effect, and even in a case where the tone effect is changed, the filter needs to be replaced each time. In the present configuration, with the emission of the effect light Le by the light source 46 built in the housing body 12 to the photosensitive surface 34A, it is possible to easily impart the tone effect to the subject image.

Further, in the camera 10 according to the present embodiment, the light source 46 is provided around the exposure aperture 38A through which the subject light Lo passes. With the provision of the light source 46 around the exposure aperture 38A, the light source 46 can be brought close to the center C of the photosensitive surface 34A. Accordingly, the bias of a light amount distribution of the effect light Le on the photosensitive surface 34A is reduced.

Further, in the camera 10 according to the present embodiment, the frame member 38 is provided with the exposure aperture 38A through which the subject light Lo passes. The plurality of light sources 46 are provided around the exposure aperture 38A in the frame member 38. With the provision of the plurality of light sources 46 around the exposure aperture 38A of the frame member 38, a distance from the light source 46 to the film 34 is made uniform and the light source 46 can be brought close to the center C of the photosensitive surface 34A. Accordingly, the bias of the light amount distribution of the effect light Le on the photosensitive surface 34A is reduced.

Further, the camera 10 according to the present embodiment is provided with the diffusion member 40 that diffuses the effect light Le. The effect light Le is emitted to the photosensitive surface 34A via the diffusion member 40. Accordingly, since the effect light Le is diffused, the bias of the light amount distribution of the effect light Le on the photosensitive surface 34A of the film 34 is reduced.

Further, in the camera 10 according to the present embodiment, the diffusion member 40A comprises the pair of diffusion parts 42A and the coupling part 43A that couples the diffusion parts 42A. Each of the pair of diffusion parts 42A faces the first LED light source 46A and the second LED light source 46B in the light source 46. Further, the diffusion member 40A is a member in which the diffusion part 42A and the coupling part 43A are integrally molded. Accordingly, with the integration of the diffusion member 40A covering the light source 46, it is possible to reduce the number of components.

Further, in the camera 10 according to the present embodiment, the diffusion member 40A is attached with the light shielding member 44 that shields the effect light Le leaking from the coupling part 43A toward the photosensitive surface 34A. Accordingly, the unnecessary leakage of the effect light Le is suppressed, and the contribution to uniformization of the light amount distribution on the photosensitive surface 34A is realized.

Further, in the camera 10 according to the present embodiment, the plurality of light sources 46 are disposed at the positions symmetrical to each other with respect to the center of the photosensitive surface 34A in a case where the film 34 in a loaded state is viewed in a plan view. Accordingly, for example, as compared with a case where the light source 46 is unevenly distributed on one side with respect to the center C of the photosensitive surface 34A of the film 34, the bias of the light amount distribution of the effect light Le on the photosensitive surface 34A of the film 34 is reduced.

In a case where the light amount distribution of the effect light Le is biased, the exposure to the effect light Le is biased depending on the type of the tone effect, and the tone effect intended by the user may not be obtained. Further, in a case where the light amount distribution of the effect light Le is biased, the sensitivity of the photosensitive surface 34A reaches an upper limit due to the exposure to the effect light Le, and the subject image may not be recorded. Since the camera 10 according to the present embodiment is configured as described above, the bias of the light amount distribution of the effect light Le on the photosensitive surface 34A of the film 34 is reduced.

Further, in the camera 10 according to the present embodiment, the light source 46 can emit the plurality of types of effect light Le for obtaining the different types of tone effects, according to the setting of the parameter. Further, the camera 10 comprises the reception device 30 that receives the designation of the type of the tone effect. In the processor 62 of the control device 60, the acquisition unit 62A acquires the effect specification information 72 that can specify the type of the tone effect received via the reception device 30. The light source control unit 62B executes the control of setting the parameter of the light source 46 according to the type of the tone effect indicated by the effect specification information 72. Accordingly, the light emission of the light source 46 according to the tone effect designated by the user is realized.

Further, in the camera 10 according to the present embodiment, the light source 46 is configured of the light emitting elements 47 of red (R), green (G), and blue (B), and with the adjustment of the light amount ratios of light emitted by the light emitting elements 47, it is possible to emit the plurality of types of effect light Le. Accordingly, since the types of the effect light Le are increased as compared with a case where the light source 46 is configured of a monochromatic light emitting element, it is realized that various types of tone effects are imparted to the subject image.

Further, in the camera 10 according to the present embodiment, the light emitting elements 47 of red (R), green (G), and blue (B) perform the pulse light emission according to the driving pulse to be periodically input, and the parameter includes at least one of the duty ratio of the driving pulse of the light emitting element or the light emission time decided by the repetition number of the driving pulse. Accordingly, it is realized that various types of tone effects are imparted to the subject image. For example, since the types of the effect light Le are increased as compared with a case where the light emission time and the emitted light color of the light emitting element 47 are always constant, it is realized that various types of tone effects are imparted to the subject image.

Further, in the camera 10 according to the present embodiment, the light emitting elements 47 of red (R), green (G), and blue (B) constituting the light source 46 are the LEDs. Accordingly, since the emitted light color is adjusted by adjusting the duty ratio of the driving pulse of the LED and the light emission time decided by the repetition number of the driving pulse, it is easy to adjust the emitted light color of the LED. For example, it is easy to adjust the emitted light color in the LED as compared with a case where the color adjustment is performed by phase control.

Further, in the camera 10 according to the present embodiment, the developer 34B for developing the latent image recorded on the photosensitive surface 34A is sealed in the film 34. In a case where the film 34 is discharged from the camera 10, the developer 34B is applied to the exposed photosensitive surface 34A. In this manner, since the tone effect caused by the effect light Le is imparted to the instant film in which the developer 34B is capable of being applied on the photosensitive surface 34A, it is possible to enjoy, on a spot where the image is captured, the subject image to which the tone effect is imparted.

Further, in the camera 10 according to the present embodiment, the tone effect is imparted to the subject image as the visual effect. Accordingly, with the visual recognition of the subject image to which the tone effect is imparted, the user can enjoy the visual performance effect (here, tone change) on the subject image.

In the first embodiment, the form example has been described in which the light source 46 is provided inside the lens barrel 14 via the frame member 38, but the technique of the present disclosure is not limited thereto. For example, an aspect may be also employed in which the light source 46 is directly attached to the inside of the lens barrel 14. In this case, the light source 46 is provided around the exposure aperture provided in the housing body 12.

Further, in the first embodiment, the form example has been described in which the diffusion member 40 is attached to the frame member 38, but the technique of the present disclosure is not limited thereto. For example, an aspect may be employed in which the diffusion member 40 is integrated with the light source 46 and the diffusion member 40 is directly provided inside the lens barrel 14.

Second Embodiment

In the first embodiment described above, the form example has been described in which the light source 46 is provided on the frame member 38 provided in the lens barrel 14, but the technique of the present disclosure is not limited thereto. In the present second embodiment, the light source 46 is fixed inside the housing body 12.

Figure 15:
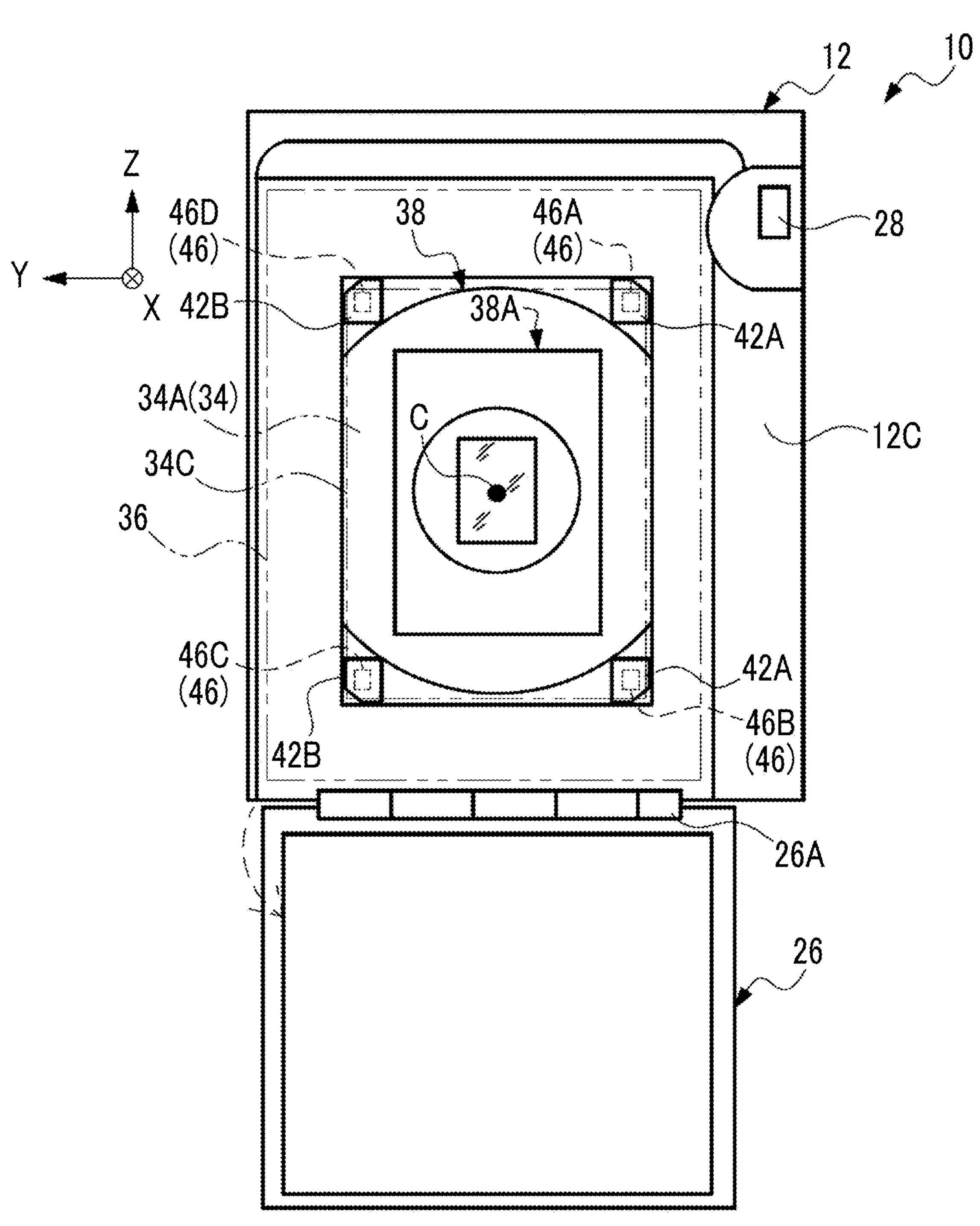
FIG. 15 is an external rear surface view of an example of a configuration of a camera according to an embodiment.

As shown in FIG. 15 as an example, the light source 46 is fixed to the housing body 12. Here, the term "fixed" refers to an aspect in which the light source 46 is attached at a predetermined position inside the housing body 12 during the use of the camera 10, and includes not only an aspect in which the light source 46 is completely fixed but also an aspect in which the light source 46 is attachable and detachable for replacement or the like. The light source 46 is disposed at a position facing an outer peripheral edge 34C of the photosensitive surface 34A with respect to the photosensitive surface 34A of the film 34, in a case where the film 34 in a state of being loaded inside the housing body 12 is viewed in a plan view (that is, as viewed from the X direction shown in FIG. 15). In the example shown in FIG. 15, the first LED light source 46A to the fourth LED light source 46D are respectively disposed at positions facing four corners of the outer peripheral edge 34C of the photosensitive surface 34A of the film 34.

Here, the position facing the outer peripheral edge 34C of the photosensitive surface 34A refers to a position facing a predetermined range (for example, within 10 mm on an inner side and within 10 mm on an outer side with reference to the outer peripheral edge) including the outer peripheral edge 34C of the photosensitive surface 34A, the position at which the effect light Le from the light source 46 can reach the outer peripheral edge of the photosensitive surface 34A.

Further, the positions facing the four corners of the photosensitive surface 34A refer to positions facing a predetermined range (for example, within a radius of 10 mm from a center at points of the four corners) including the four corners of the photosensitive surface 34A, the positions at which the effect light Le from the light source 46 can reach the four corners of the photosensitive surface 34A. The diffusion part 42A faces the first LED light source 46A and the second LED light source 46B. Further, the diffusion part 42B faces the third LED light source 46C and the fourth LED light source 46D. The diffusion parts 42A and 42B are attached to the housing body 12.

As described above, in the camera 10 according to the second embodiment, the light source 46 is fixed to the housing body 12. Accordingly, for example, as compared with a case where the light source 46 is provided in the lens barrel 14, the distance between the light source 46 and the photosensitive surface 34A caused by the expansion and contraction of the lens barrel 14 is less likely to be changed. As a result, the change in the tone effect due to the change in the emission distance of the effect light Le is suppressed.

Further, in the camera 10 according to the second embodiment, the light source 46 is provided at the position facing the outer peripheral edge 34C of the photosensitive surface 34A of the film 34. Accordingly, it is realized that the tone effect is imparted to the outer peripheral edge of the photosensitive surface 34A.

Further, in the camera 10 according to the second embodiment, the light sources 46 are provided at the positions facing the four corners of the photosensitive surface 34A of the film 34. Accordingly, it is realized that the tone effect is imparted to the four corners of the photosensitive surface 34A.

In the second embodiment described above, the form example has been described in which the light sources 46 are provided at the positions facing the four corners, but the technique of the present disclosure is not limited thereto. As long as the light source 46 is provided at the position facing at least one of the four corners of the photosensitive surface 34A, the number and disposition of the light sources 46 may be set as appropriate according to the type of the tone effect or the light amount distribution in the photosensitive surface 34A.

First Modification Example

In the second embodiment, the form example has been described in which the light sources 46 are provided at the positions facing all the four corners of the photosensitive surface 34A, but the technique of the present disclosure is not limited thereto. In the present first modification example, the light source 46 is provided only at a position facing one of the four corners of the photosensitive surface 34A.

Figure 16:
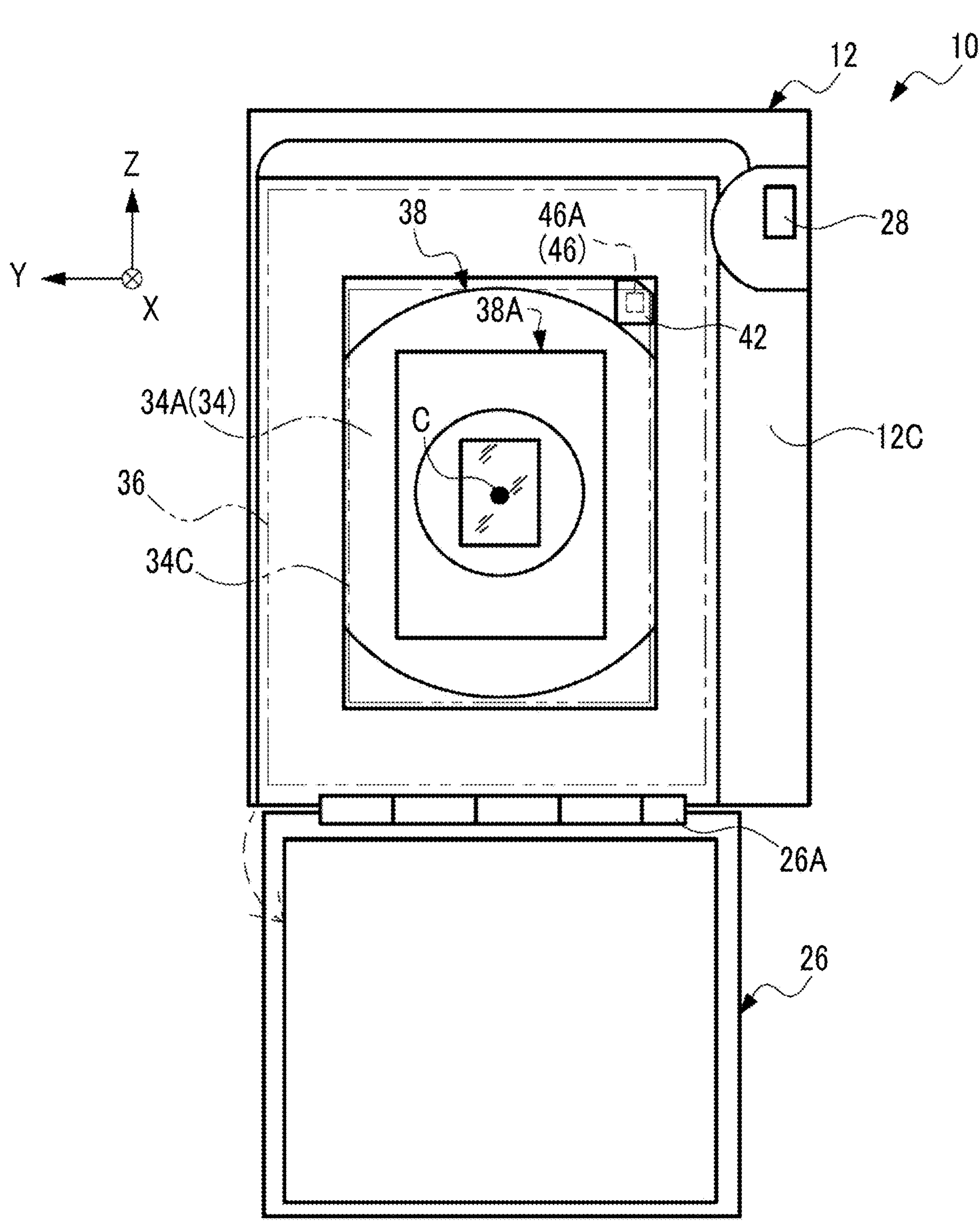
FIG. 16 is an external rear surface view of the example of the configuration of the camera according to the embodiment.

As shown in FIG. 16 as an example, the light source 46A is provided only at a position facing an upper right corner of the photosensitive surface 34A in a case where the film 34 is viewed in a plan view. In this manner, one light source 46 is provided in the housing body 12. Accordingly, it is realized that the tone effect is imparted to only one of the four corners of the photosensitive surface 34A. Further, since there is only one light source 46, it is possible to suppress electric power consumption required to impart the tone effect.

In the present first modification example, the form example has been described in which the light source 46 is provided in the upper right corner, but this is merely an example. It is needless to say that the light source 46 may be provided at a position facing another position on the outer peripheral edge 34C of the photosensitive surface 34A.

Second Modification Example

In the second embodiment, the form example has been described in which the light sources 46 are provided at the positions facing the four corners of the photosensitive surface 34A, but the technique of the present disclosure is not limited thereto. In the present second modification example, the plurality of light sources 46 are provided at positions facing intermediate positions on respective sides of four sides of the photosensitive surface 34A. Here, the intermediate positions mean positions other than end points corresponding to the four corners on the respective sides of the four sides. The intermediate position may be a center of each side or may be a position that is offset from the center toward one end point side.

Figure 17:
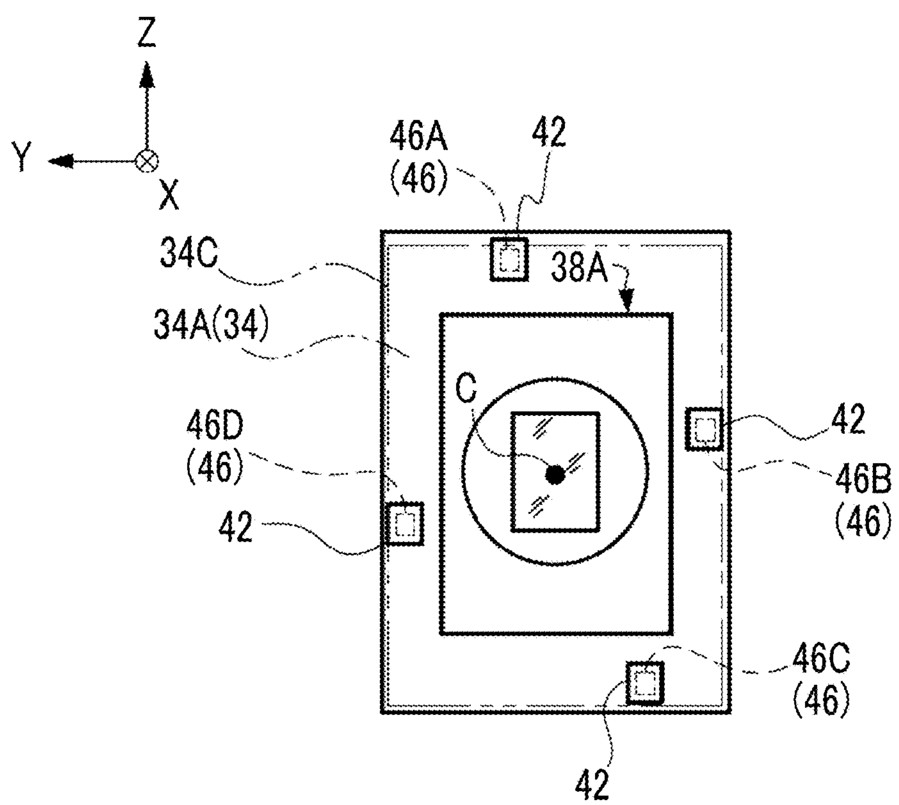
FIG. 17 is a conceptual diagram showing an example of disposition of a light source according to the embodiment.

As shown in FIG. 17 as an example, the first LED light source 46A to the fourth LED light source 46D are respectively disposed at the positions facing the intermediate positions on the respective sides of the four sides of the photosensitive surface 34A of the film 34. In the example shown in FIG. 17, more specifically, the first LED light source 46A to the fourth LED light source 46D are disposed at the positions that are offset from the center toward one end point side on each side. In this manner, in the present second modification example, with the provision of the light sources 46 at the positions facing the intermediate positions of the respective sides of the four sides of the photosensitive surface 34A, it is realized that the tone effect is imparted to the four sides of the photosensitive surface 34A.

In the second modification example described above, the form example has been described in which the light sources 46 are provided at the positions facing the intermediate positions on the respective sides of the four sides, but the technique of the present disclosure is not limited thereto. As long as the light source 46 is provided at the position facing the intermediate position on at least one of the four sides of the photosensitive surface 34A, the number and disposition of the light sources 46 may be set as appropriate according to the type of the tone effect or the light amount distribution in the photosensitive surface 34A.

Third Modification Example

In the second embodiment, the form example has been described in which the light sources 46 are provided at the positions facing the four corners of the photosensitive surface 34A, but the technique of the present disclosure is not limited thereto. In the present third modification example, the plurality of light sources 46 are concentrically disposed with respect to the center C.

Figure 18:
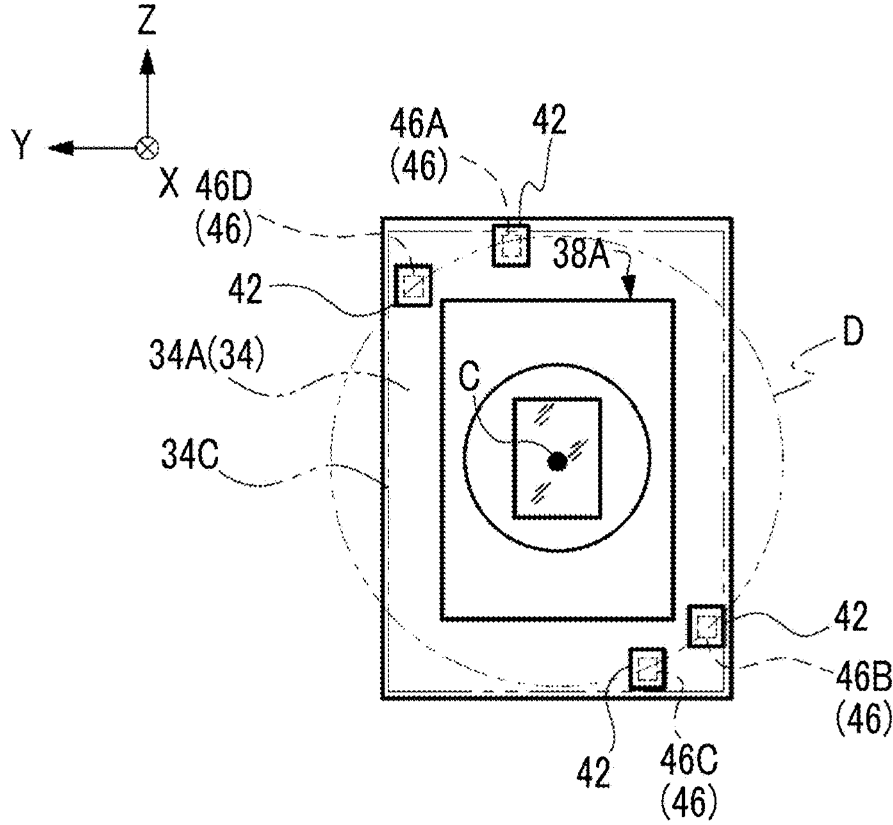
FIG. 18 is a conceptual diagram showing the example of disposition of the light source according to the embodiment.

As shown in FIG. 18 as an example, the first LED light source 46A to the fourth LED light source 46D are respectively disposed concentrically with respect to the center C of the photosensitive surface 34A of the film 34. Specifically, the first LED light source 46A to the fourth LED light source 46D are disposed on a circumference of a circle D having the center C. A size (for example, radius) of the circle D, and the position and number of the light sources 46 on the circumference may be set as appropriate according to the type of tone effect or the light amount distribution on the photosensitive surface 34A. In this manner, in the present third modification example, with the concentric disposition of the light source 46 with respect to the center C of the photosensitive surface 34A, it is realized that the tone effect is concentrically imparted to the photosensitive surface 34A.

The form example has been described here in which the first LED light source 46A to the fourth LED light source 46D are disposed on the circumference of one circle D, but this is merely an example. The light sources 46 may be disposed on circumferences of a plurality of circles.

Fourth Modification Example

In the second embodiment, the form example has been described in which the plurality of light sources 46 are disposed at an equal distance from the photosensitive surface 34A in a direction along the optical axis, but the technique of the present disclosure is not limited thereto. In the present fourth modification example, the plurality of light sources 46 are disposed at different distances from the photosensitive surface 34A.

Figure 19:
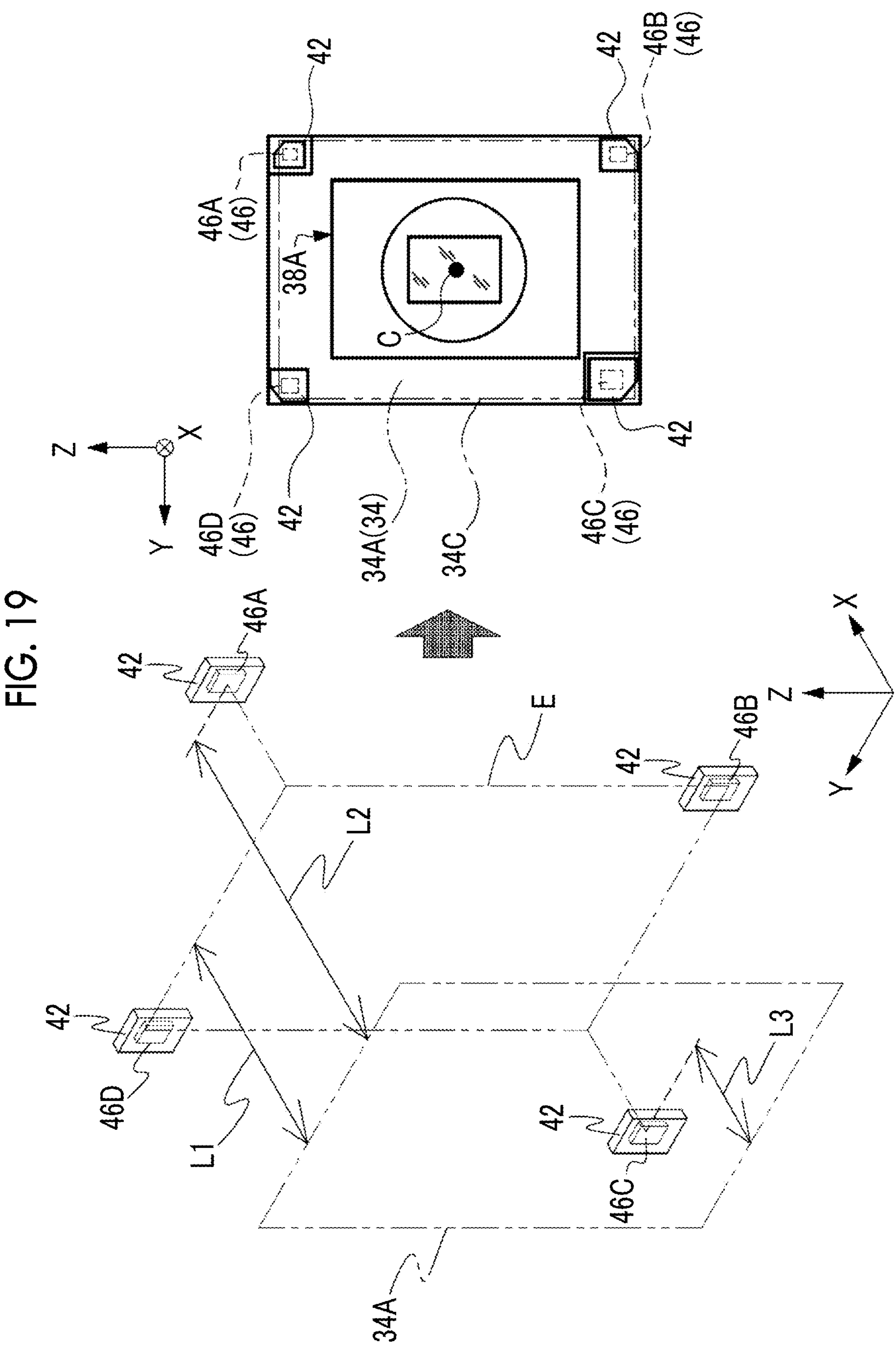
FIG. 19 is a conceptual diagram showing the example of disposition of the light source according to the embodiment.

As shown in FIG. 19 as an example, the plurality of light sources 46 are disposed at positions having different distances from the photosensitive surface 34A, in the direction along the optical axis (X direction shown in FIG. 19). Specifically, the second LED light source 46B and the fourth LED light source 46D are disposed on the same plane E. The plane E is a virtual plane parallel to the photosensitive surface 34A. The plane E is set at a distance L1 from the photosensitive surface 34A. The first LED light source 46A and the third LED light source 46C are disposed at positions different from the plane E in the distance from the photosensitive surface 34A, in the direction along the optical axis from the photosensitive surface 34A. Specifically, the first LED light source 46A is disposed at a position having a distance L2 from the photosensitive surface 34A, which is longer than the distance L1 from the photosensitive surface 34A of the plane E. Further, the third LED light source 46C is disposed at a position having a distance L3 from the photosensitive surface 34A, which is shorter than the distance L1 from the photosensitive surface 34A of the plane E.

That is, the first LED light source 46A is disposed at a position deeper than the other light sources 46 in a case where the photosensitive surface 34A is viewed in a plan view. Further, the third LED light source 46C is disposed closer to the photosensitive surface 34A than the other light sources 46. Further, the second LED light source 46B and the fourth LED light source 46D are disposed between the first LED light source 46A and the third LED light source 46C.

As described above, in the present fourth modification example, the plurality of light sources 46 are disposed at the different distances from the photosensitive surface 34A in the direction along the optical axis. Accordingly, since the emission range and the exposure amount of the effect light Le emitted from the plurality of light sources 46 change, it is possible to change the tone effect on the photosensitive surface 34A.

The disposition of the plurality of light sources 46 shown in the fourth modification example is merely an example. As long as at least any one of the plurality of light sources 46 is present on a different plane from the other light sources 46, the technique of the present disclosure is established. Further, the plurality of light sources 46 may be disposed on planes different from each other. Further, the distance from the photosensitive surface 34A, the position, and the number of the plurality of light sources 46 may be set as appropriate according to the type of tone effect or the light amount distribution on the photosensitive surface 34A.

Third Embodiment

In the first embodiment described above, the form example has been described in which the light source control unit 62B executes the setting of the parameter for the light source 46 according to the effect mode designated by the user, but the technique of the present disclosure is not limited thereto. In the present third embodiment, in addition to the control of the parameter, exposure control of adjusting the amount of the subject light Lo according to the amount of the effect light Le is executed.

Figure 20:
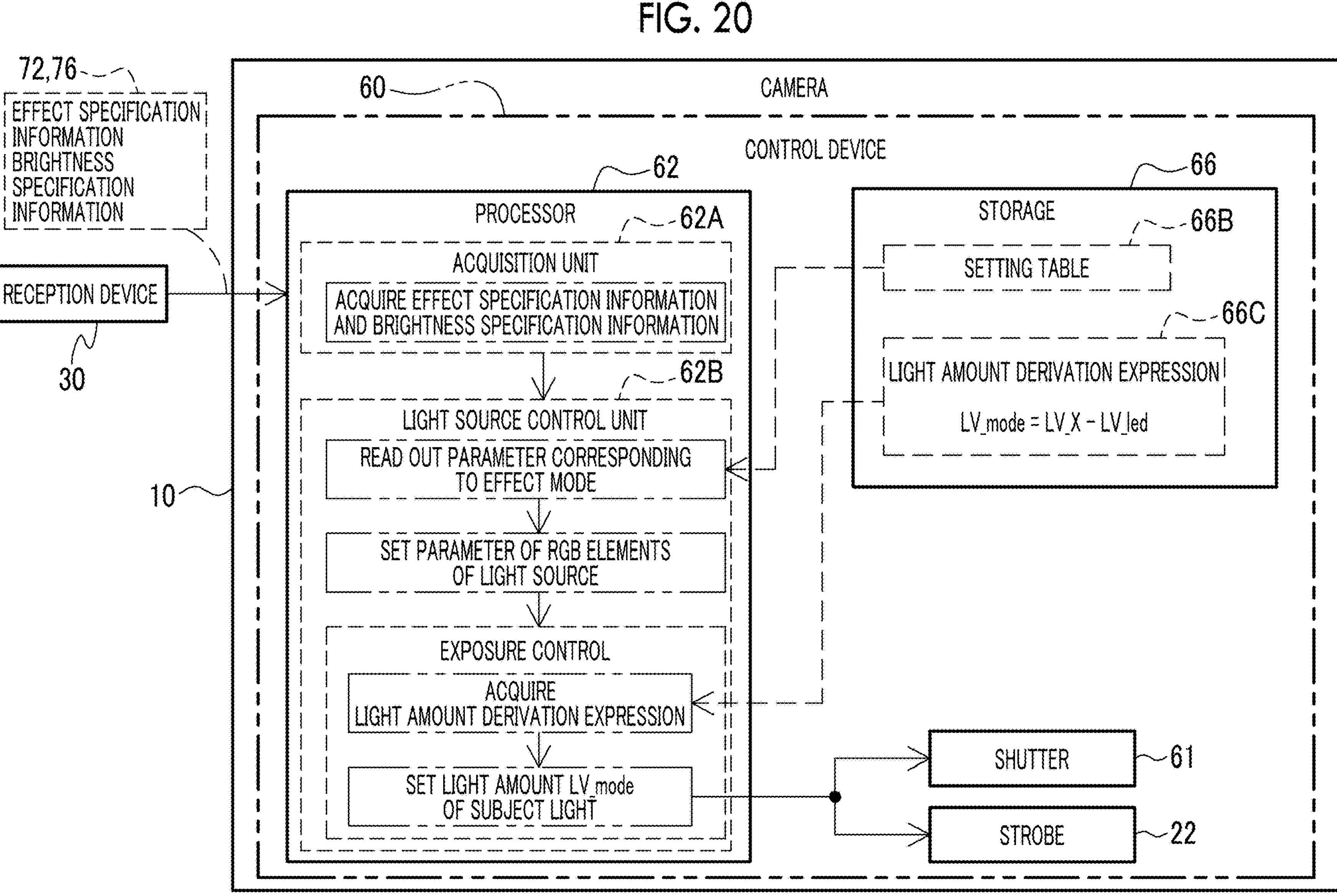
FIG. 20 is a conceptual diagram showing an example of a main function of a processor of a camera according to an embodiment.

As shown in FIG. 20 as an example, the reception device 30 receives the designation of the type of the tone effect (for example, the designation of the effect mode) from the user. Further, the reception device 30 receives a designation (for example, a designation of a brightness mode) related to an exposure amount of the photosensitive surface 34A from the user. The reception device 30 outputs the effect specification information 72 and brightness specification information 76 to the processor 62. Here, the brightness specification information 76 is information that is capable of specifying the exposure amount of the photosensitive surface 34A.

The example has been described here in which the type of brightness is set in advance as the brightness mode in the camera 10, but this is merely an example. The brightness may be adjusted by the user (for example, the exposure amount may be directly input).

Further, the form example has been described here in which the reception device 30 receives both the designation of the type of tone effect and the designation of the exposure amount of the photosensitive surface 34A, but this is merely an example. The designation of the type of the tone effect and the designation of the exposure amount of the photosensitive surface 34A may be performed by separate reception devices.

In the processor 62, the acquisition unit 62A acquires the effect specification information 72 and the brightness specification information 76 from the reception device 30. The light source control unit 62B executes the control of setting the parameter of the light source 46 according to the type of the tone effect indicated by the effect specification information 72 (refer to FIG. 11). Specifically, the light source control unit 62B acquires the setting table 66B from the storage 66, and sets a parameter, which corresponds to the effect mode, for the light emitting element 47 of the light source 46 by using the acquired setting table 66B.

Further, in a case where the designation regarding the exposure amount of the photosensitive surface 34A by the user is received, the light source control unit 62B executes the exposure control of adjusting the amount of the subject light Lo that reaches the photosensitive surface 34A according to the amount of the effect light Le. Specifically, the light source control unit 62B acquires a light amount derivation expression 66C from the storage 66. The light amount derivation expression 66C is a calculation expression in which a value, which is obtained by subtracting a light amount LV_led of the effect light Le from a light amount LV_X according to the exposure amount designated by the user, is set to a light amount LV_mode of the subject light, and is represented by the following Expression (1).

$$LV\_mode = LV\_X - LV\_led \quad (1)$$

Here, LV_X is the exposure amount designated by the user, and is, for example, the exposure amount obtained by adding an exposure correction amount added by the user to appropriate exposure. Further, in a case where the exposure correction amount is zero, the LV_X is an appropriate exposure amount. For example, for the exposure amount LV_X designated by the user, in a case where the appropriate exposure amount is LV, the brightness mode can be set stepwise, for example, in the order of ½ LV, ⅔ LV, LV, 4/3 LV, and 3/2 LV from a dark side according to the exposure correction amount. This is merely an example, and it is needless to say that the light amount is set as appropriate for each brightness mode.

The light source control unit 62B obtains the light amount LV_X according to the exposure amount indicated by the brightness specification information 76. For example, the light source control unit 62B obtains the exposure amount as the light amount LV_X. Further, the light source control unit 62B obtains the light amount LV_led of the effect light Le according to a setting result of the parameter of the light source 46. The light source control unit 62B derives the light amount LV_mode of the subject light Lo by using the light amount derivation expression 66C.

The form example has been described here in which the light amount LV_mode is derived by using the light amount derivation expression 66C, but this is merely an example. A light amount derivation table (not shown) may be used instead of the light amount derivation expression 66C. The light amount derivation table is a table in which the light amount LV_X according to the exposure amount designated by the user and the light amount LV_led of the effect light Le are used as the input information and the light amount LV_mode of the subject light Lo is used as the output information.

The light source control unit 62B controls the shutter 61 and/or the strobe 22 in order to set the derived light amount LV_mode of the subject light Lo. For example, the light source control unit 62B sets a shutter speed in the shutter 61. Further, for example, the light source control unit 62B sets the light emission time in the strobe 22. In this manner, the light source control unit 62B executes the adjustment of setting the value, which is obtained by subtracting a light amount LV_led of the effect light Le from a light amount LV_X according to the exposure amount designated by the user, to the light amount LV_mode. That is, with the execution of such adjustment, it is possible to perform the exposure control in consideration of the effect light Le of the light source 46. Here, although not shown, in a case where the optical system 58 has the stop, the light source control unit 62B may perform the exposure control through the setting of a stop amount.

As shown in FIG. 21 as an example, the light source control unit 62B determines whether or not the imaging instruction signal, which is output in a case where the release button 18 is pressed, is received. In a case where affirmative determination is made, the effect light Le is emitted from the light source 46 toward the photosensitive surface 34A of the film 34 under the control of the light source control unit 62B. Further, with the operation of the shutter 61 and the strobe 22 under the control of the light source control unit 62B, the subject light Lo is adjusted to the light amount LV_mode. Specifically, the light amount LV_mode is set to the value obtained by subtracting a light amount LV_led of the effect light Le from a light amount LV_X according to the exposure amount designated by the user. As a result, even in a case where the photosensitive surface 34A is exposed to the effect light Le, the exposure of the photosensitive surface 34A with the brightness designated by the user is realized.

As described above, in the camera 10 according to the present third embodiment, in the processor 62, the light source control unit 62B executes the exposure control of adjusting the amount of the subject light Lo that reaches the photosensitive surface 34A according to the amount of the effect light Le emitted from the light source 46, in a case where the designation by the user regarding the exposure amount of the photosensitive surface 34A is received. Accordingly, the light amount LV_mode of the subject light Lo is adjusted according to the light amount LV_led by the effect light Le. As a result, the imaging with the exposure amount designated by the user is realized.

For example, in a case where the effect light Le is emitted and the light amount LV_mode of the subject light Lo is not adjusted at all, since the photosensitive surface 34A is exposed to the effect light Le and the subject light Lo in a superimposed manner, the exposure is performed with brightness not intended by the user (for example, a state brighter than expected brightness by the effect light Le). In the present configuration, the light amount LV_mode of the subject light Lo is adjusted according to the light amount LV_led of the effect light Le. Accordingly, the imaging with the exposure amount designated by the user is realized.

Further, in the camera 10 according to the present third embodiment, the exposure control is to execute adjustment of setting a light amount, which is obtained by subtracting the light amount LV_led of the effect light Le from the light amount LV_X according to the exposure amount designated by the user, to the light amount LV_mode of the subject light Lo. Since the adjustment is executed in which the light amount obtained by subtracting the light amount LV_led of the effect light Le from the light amount LV_X is set to the light amount LV_mode of the subject light Lo, the imaging with the exposure amount designated by the user is realized.

In the above embodiment, the form example has been described in which the light amount ratio of the light source 46 is adjusted by the duty ratio of the driving pulse of the light emitting element 47 constituting the light source 46 and the light emission time decided by the repetition number of the driving pulse, but the technique of the present disclosure is not limited thereto. The light source 46 may continuously emit light and a turning-on time of the continuous light emission may be adjusted to adjust the light amount ratio of the light source 46.

Further, in the above embodiment, the form example has been described in which all the light sources 46 emit the light, but the technique of the present disclosure is not limited thereto. An aspect may be employed in which only a part of the light sources 46 emits the light according to the effect mode. Further, an aspect may be employed in which a light source 46 randomly selected from the light sources 46 emits the light according to the effect mode. Further, it is not necessary that all the light amounts of the light sources 46 are the same, and an aspect may be employed in which the light amount of each of the plurality of light sources 46 is changed according to the effect mode.

Further, in the above embodiment, the form example has been described in which the exposure is performed by the effect light Le together with the subject light Lo, but the technique of the present disclosure is not limited thereto. For example, the exposure to the subject light Lo is performed and then the exposure to the effect light Le may be performed after a predetermined time has elapsed (for example, after one second).

Further, in the above embodiment, the form example has been described in which the effect light Le is emitted from the light source 46 in a case where the release button 18 is pressed, but the technique of the present disclosure is not limited thereto. In a case where a predetermined condition regarding the emission of the effect light Le (for example, a condition for suppressing unintended emission of the effect light Le) is satisfied, the light source control unit 62B executes control of permitting the emission of the effect light Le to the light source 46. Specifically, an aspect may be adopted in which the light source control unit 62B permits, in a case where the release button 18 is pressed and then the finger F is detected to be separated from the release button 18, the emission of the effect light Le. Accordingly, even in a case where the release button 18 is erroneously pressed a plurality of times (for example, in a case where the release button 18 is pressed again before the release button 18 is returned to an original position), the effect light Le is prevented from being emitted each time.

Further, as another example, an aspect may be employed in which the light source control unit 62B permits, in a case where the effect light Le is emitted and then a predetermined time (for example, 10 seconds) has elapsed, the emission of the effect light Le to the light source 46. Accordingly, even in a case where the release button 18 is erroneously pressed a plurality of times (for example, in a case where the release button 18 is pressed many times at an interval of one second), the effect light Le is prevented from being emitted each time.

Further, in the above embodiment, the form example has been described in which the light source 46 emits the light during the emission of the effect light Le, but the technique of the present disclosure is not limited thereto. For example, the light source 46 may be configured to turn on or off in a case where the cover 26 is opened. Accordingly, the user can visually recognize that the cover 26 is in an opened state. Further, in a case where a failure inside the housing 11 is checked, with the turning-on of the light source 46, internal brightness is secured and thus a failure location is easily checked.

Further, an aspect may be employed in which the first LED light source 46A to the fourth LED light source 46D are turned on and off in order. Accordingly, with visual recognition of the first LED light source 46A to the fourth LED light source 46D that are sequentially turned on and off by the user, during replacement of the cartridge 36, it is realized that the user experience, such as fun in a case where the camera 10 is used, is improved.

Further, attachment angles of the first LED light source 46A to the fourth LED light source 46D are not particularly limited as long as the effect light Le can be emitted to the photosensitive surface 34A. For example, an aspect may be employed in which a central axis of luminous flux of the effect light Le emitted from the first LED light source 46A to the fourth LED light source 46D is inclined with respect to a normal direction of the photosensitive surface 34A.

Further, in the above embodiment, the form example has been described in which the diffusion member 40 is formed by integrally molding the pair of diffusion parts 42A and the coupling part 43A, but the technique of the present disclosure is not limited thereto. The diffusion member 40A may have four diffusion parts corresponding to the four light sources 46 and may be formed with the four diffusion parts as an integrated component.

Further, in the above embodiment, the form example has been described in which the light shielding member 44A that shields the effect light Le leaking from the coupling part 43A is provided, but the technique of the present disclosure is not limited thereto. For example, the coupling part 43A itself may be formed of a material having a light-shielding property.

In the above embodiment, the form example has been described in which the diffusion member 40 is provided, but the technique of the present disclosure is not limited thereto. The camera 10 may have an aspect in which the effect light Le is directly emitted to the photosensitive surface 34A without the diffusion member 40.

Further, in the above embodiment, the form example has been described in which the plurality of buttons are provided as the reception device 30, but the technique of the present disclosure is not limited thereto. For example, an operation dial may be provided as the reception device 30 together with the plurality of buttons or instead of the plurality of buttons. An aspect may be employed in which the effect mode and/or the brightness mode are switched by rotating the operation dial.

Further, in the above embodiment, the form example has been described in which the camera 10 is the instant camera, but the technique of the present disclosure is not limited thereto. The camera 10 may be a film camera other than the instant camera.

Figure 22:
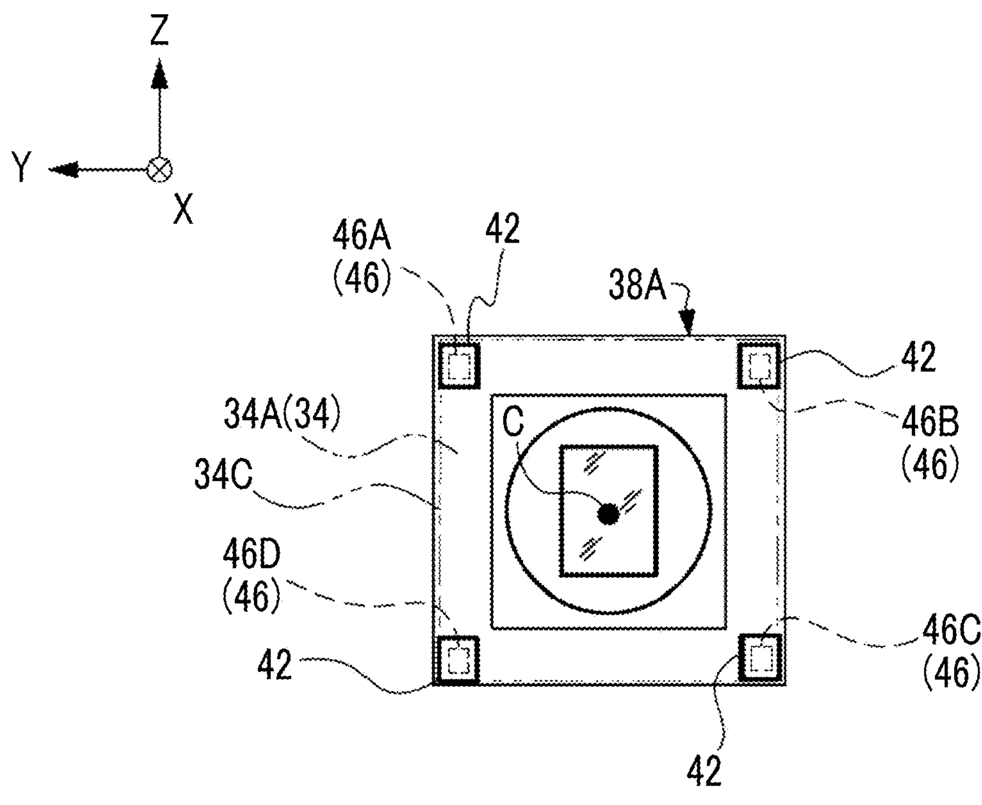
FIG. 22 is a conceptual diagram showing an example of a shape of a film according to the embodiment.

Further, in the above embodiment, the form example has been described in which the film 34 has a rectangular shape having the long side extending along the Z direction in a case where the film 34 is viewed in a plan view, but the technique of the present disclosure is not limited thereto. As shown in FIG. 22 as an example, the film 34 may have a square shape in a case where the film 34 is viewed in a plan view.

Figure 23:
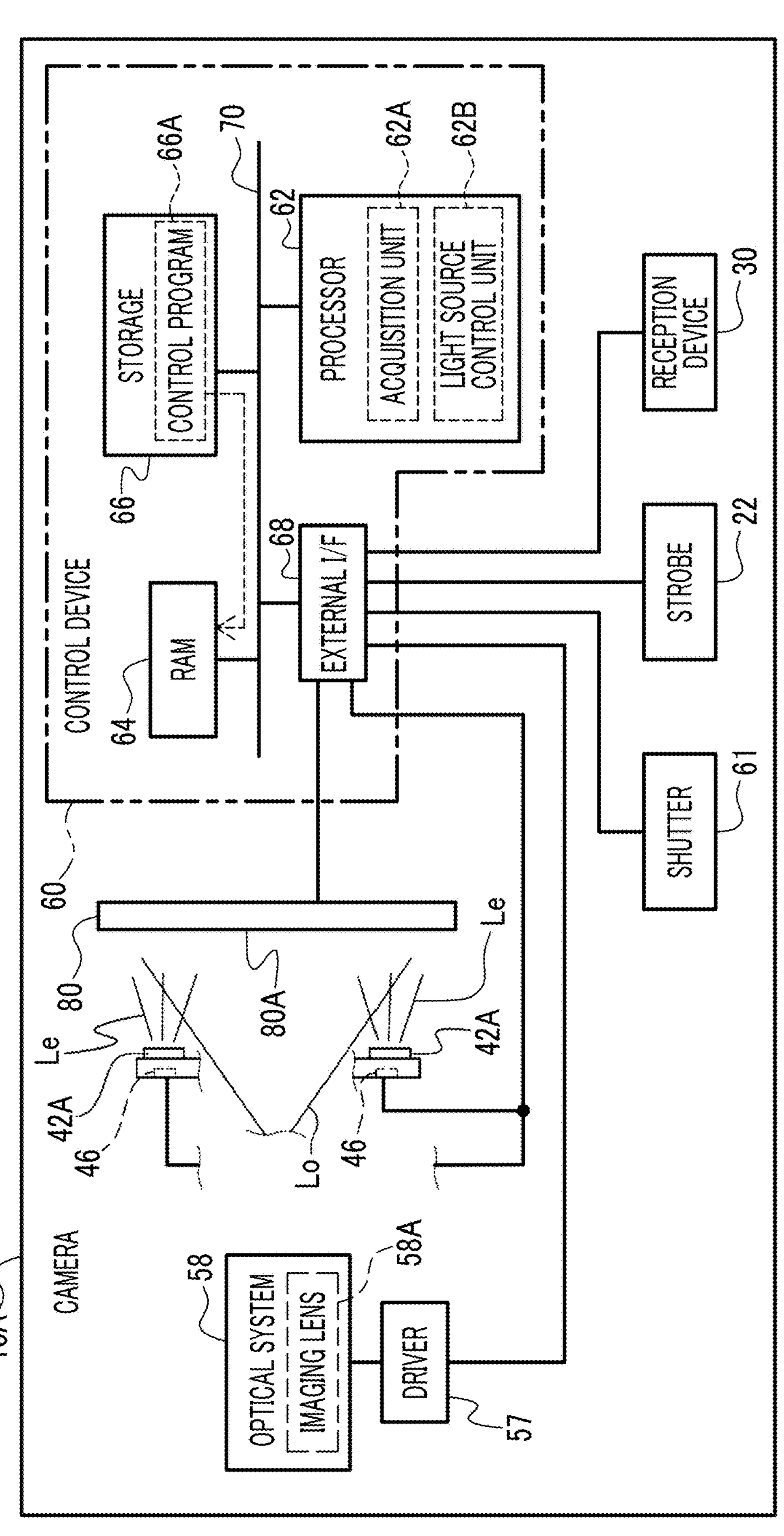
FIG. 23 is a block diagram showing an example of a hardware configuration of an electric system of the camera according to the embodiment.

Further, in the above embodiment, the form example has been described in which the camera 10 is the film camera, but the technique of the present disclosure is not limited thereto. As shown in FIG. 23 as an example, the camera 10A is a digital camera. The camera 10A is an example of "imaging apparatus" according to the technique of the present disclosure. In this case, the camera 10A comprises an imaging element 80 instead of the film 34. The imaging element 80 is an example of "imaging element" according to the technique of the present disclosure. The imaging element 80 is disposed inside the housing body 12. For example, the imaging element 80 is operated under the control of the control device 60 and receives the subject light Lo emitted from the optical system 58. That is, the imaging element 80 captures the subject image. The imaging element 80 is a complementary metal oxide semiconductor (CMOS) image sensor, for example. The imaging element 80 images the subject under an instruction of the control device 60. The imaging element 80 generates a digital image that is a digital imaging signal indicating the subject image. The imaging element 80 outputs the generated digital image to the control device 60.

Here, the CMOS image sensor is exemplified for description as an example of the imaging element 80, but the technique of the present disclosure is not limited thereto. A charge coupled device (CCD) image sensor may be employed as the imaging element 80.

Further, the light source 46 is disposed at a position facing a light-receiving surface 80A of the imaging element 80. The imaging element 80 also receives the effect light Le emitted from the light source 46 together with the subject light Lo. Accordingly, the tone effect caused by the effect light Le is imparted to the digital image indicating the subject image.

Further, in the above embodiment, the form example has been described in which the camera 10 is a portable imaging apparatus, but the technique of the present disclosure is not limited thereto. The technique of the present disclosure can also be applied to a stationary imaging apparatus (for example, an imaging apparatus for face photo imaging or an imaging apparatus for imaging a state of an experience at an amusement facility).

Further, in the above embodiment, the form example has been described in which the control program 66A is stored in the storage 66, but the technique of the present disclosure is not limited thereto. For example, the control program 66A may be stored in a storage medium (not shown), such as an SSD or a universal serial bus (USB) memory. The storage medium is a portable computer-readable non-transitory storage medium. The control program 66A stored in the storage medium is installed in the camera 10. The processor 62 executes the light source control processing in accordance with the control program 66A.

Further, the control program 66A may be stored in a storage device of another computer, a server, or the like that is connected to the camera 10 via a network, and the control program 66A may be downloaded in response to a request of the camera 10 to be installed in the camera 10. That is, a form may be employed in which the program (for example, program product) described in the present embodiment is provided by a recording medium or is distributed from an external computer.

Further, in the above embodiment, although the processor 62, the storage 66, and the RAM 64 of the camera 10 are exemplified as a computer, the technique of the present disclosure is not limited thereto. Instead of the computer, a device including an application specific integrated circuit (ASIC), a field-programmable gate array (FPGA), and/or a programmable logic device (PLD) may be applied. Further, a hardware configuration and a software configuration may be used in combination, instead of the computer.

As a hardware resource executing the light source control processing described in the above embodiment, various processors illustrated below can be used. Examples of the processor include a CPU which is a general-purpose processor functioning as the hardware resource for executing the processing by executing software, that is, a program. Moreover, examples of the processor include a dedicated electronic circuit which is a processor having a circuit configuration designed to be dedicated for executing specific processing, such as the FPGA, the PLD, or the ASIC. All of the processors incorporate or are connected to a memory, and all of the processors execute the processing using the memory.

The hardware resource for executing the light source control processing may be configured with one of the various processors or may be configured with a combination of two or more processors of the same type or different types (for example, combination of a plurality of FPGAs or combination of CPU and FPGA). The hardware resource for executing the light source control processing may be one processor.

As a configuring example of one processor, first, there is a form in which one processor is configured of a combination of one or more CPUs and software and the processor functions as the hardware resource for executing the light source control processing. Second, there is a form in which a processor that realizes functions of the entire system including a plurality of hardware resources for executing the light source control processing with one integrated circuit (IC) chip is used, as typified by a system-on-a-chip (SoC). In this manner, the light source control processing is realized by using one or more of various processors as the hardware resource.

As the hardware structures of various processors, more specifically, an electronic circuit in which circuit elements, such as semiconductor elements, are combined can be used. The above-described processing is just an example. Therefore, it is needless to say that removal of an unnecessary step, addition of a new step, and change of processing procedure may be employed within a range not departing from the gist.

The contents described and the contents shown hereinabove are specific descriptions regarding the part according to the technique of the present disclosure and are merely examples of the technique of the present disclosure. For example, the descriptions regarding the configurations, the functions, the actions, and the effects are descriptions regarding an example of the configurations, the functions, the actions, and the effects of the part according to the technique of the present disclosure. Accordingly, in the contents described and the contents shown hereinabove, it is needless to say that removal of an unnecessary part, or addition or replacement of a new element may be employed within a range not departing from the gist of the technique of the present disclosure. In order to avoid complication and easily understand the part according to the technique of the present disclosure, in the contents described and the contents shown hereinabove, the description regarding common general technical knowledge or the like which is not necessarily particularly described for enabling implementation of the technique of the present disclosure is omitted.

In a case where all of documents, patent applications, and technical standard described in the specification are incorporated in the specification as references, to the same degree as a case where the incorporation of each of documents, patent applications, and technical standard as references is specifically and individually noted.

Regarding the above embodiment, the following supplementary notes will be further disclosed.

Supplementary Note 1

An imaging apparatus comprising:

a housing loaded with a film on which a photosensitive surface is caused to be exposed to subject light to record a subject image; and a light source that is provided in the housing and is capable of emitting, to the photosensitive surface, effect light that exposes the photosensitive surface in a manner superimposed on the subject light to impart a visual effect to the subject image.

Supplementary Note 2

The imaging apparatus according to Supplementary Note 1, wherein the light source is provided, in the housing, around an exposure aperture through which the subject light passes.

Supplementary Note 3

The imaging apparatus according to Supplementary Note 2, wherein the housing includes a frame member provided with the exposure aperture, and the light source is provided on the frame member.

Supplementary Note 4

The imaging apparatus according to Supplementary Note 2, wherein the housing has a housing body into which the film is loaded and the exposure aperture, and the light source is disposed around the exposure aperture in the housing body.

Supplementary Note 5

The imaging apparatus according to Supplementary Note 1, wherein the housing has a housing body into which the film is loaded, and the light source is fixed to the housing body.

Supplementary Note 6

The imaging apparatus according to any one of Supplementary Notes 1 to 5, wherein a diffusion member that diffuses the effect light is included, and the effect light diffused by the diffusion member is emitted to the photosensitive surface.

Supplementary Note 7

The imaging apparatus according to Supplementary Note 6, wherein a plurality of the light sources are provided, and the diffusion member is a member in which at least two diffusion parts respectively disposed facing at least two light sources among the plurality of light sources are connected to a coupling part that couples the diffusion parts.

Supplementary Note 8

The imaging apparatus according to Supplementary Note 7, wherein the diffusion member further includes a light shielding member that shields effect light leaking from the coupling part toward the photosensitive surface by propagating from the diffusion part to the coupling part.

Supplementary Note 9

The imaging apparatus according to any one of Supplementary Notes 1 to 8, wherein a plurality of the light sources are provided, and the plurality of light sources are disposed at positions symmetrical with respect to a center of the photosensitive surface of the film in a case where the film in a loaded state is viewed in a plan view.

Supplementary Note 10

The imaging apparatus according to any one of Supplementary Notes 1 to 9, wherein the light source is provided at a position facing an outer peripheral edge of the photosensitive surface of the film.

Supplementary Note 11

The imaging apparatus according to Supplementary Note 10, wherein the light source is provided at a position facing at least one of four corners of the photosensitive surface of the film.

Supplementary Note 12

The imaging apparatus according to Supplementary Note 10, wherein the light source is provided at a position facing an intermediate position of at least one of four sides of the photosensitive surface of the film.

Supplementary Note 13

The imaging apparatus according to any one of Supplementary Notes 1 to 12, wherein the light source is disposed concentrically with respect to a center of the photosensitive surface of the film in a case where the film in a loaded state is viewed in a plan view.

Supplementary Note 14

The imaging apparatus according to any one of Supplementary Notes 1 to 6, wherein one light source is provided in the housing.

Supplementary Note 15

The imaging apparatus according to any one of Supplementary Notes 1 to 14, wherein the light source is capable of emitting a plurality of types of the effect light for obtaining different types of the visual effect according to setting of a parameter, the imaging apparatus further comprises a reception unit that receives designation of a type of the visual effect, and a processor, and the processor is configured to:

acquire effect specification information capable of specifying the type of the visual effect received via the reception unit; and execute control of setting the parameter according to the type of the visual effect indicated by the effect specification information.

Supplementary Note 16

The imaging apparatus according to Supplementary Note 15, wherein the light source is configured of a plurality of colors of light emitting elements that emit light of different colors, and is capable of emitting a plurality of types of the effect light by adjusting a light amount ratio of the pieces of light emitted by the light emitting elements of respective colors.

Supplementary Note 17

The imaging apparatus according to Supplementary Note 16, wherein the light emitting elements of the respective colors perform pulse light emission according to a periodically input driving pulse, and the parameter includes at least one of a duty ratio of the driving pulse of the light emitting element or a light emission time decided by a repetition number of the driving pulse.

Supplementary Note 18

The imaging apparatus according to Supplementary Note 16 or 17, wherein the light emitting element is an LED.

Supplementary Note 19

The imaging apparatus according to any one of Supplementary Notes 15 to 18, wherein the processor is configured to, in a case where designation by a user regarding an exposure amount of the photosensitive surface is received, execute exposure control of adjusting an amount of the subject light reaching the photosensitive surface according to an amount of the effect light emitted from the light source.

Supplementary Note 20

The imaging apparatus according to Supplementary Note 19, wherein the exposure control is control of executing adjustment of setting a light amount, which is obtained by subtracting the amount of the effect light from a light amount according to the designation by the user regarding the exposure amount, to the amount of the subject light.

Supplementary Note 21

The imaging apparatus according to any one of Supplementary Notes 1 to 20, wherein the film is an instant film in which a developer for developing a latent image recorded on the photosensitive surface is sealed and the developer is capable of being applied on the exposed photosensitive surface.

Supplementary Note 22

The imaging apparatus according to any one of Supplementary Notes 1 to 21, wherein the visual effect includes a tone effect which is an effect of adding a change to color development of the film.

What is claimed is:

1. An imaging apparatus comprising:

a housing loaded with a film on which a photosensitive surface is caused to be exposed to subject light to record a subject image; and a light source that is provided in the housing and is capable of emitting, to the photosensitive surface, effect light that exposes the photosensitive surface in a manner superimposed on the subject light to impart a visual effect to the subject image, wherein the light source is capable of emitting a plurality of types of the effect light for obtaining different types of the visual effect according to setting of a parameter, the imaging apparatus further comprises a reception unit that receives designation of a type of the visual effect, and a processor, and the processor is configured to:

acquire effect specification information capable of specifying the type of the visual effect received via the reception unit; and execute control of setting the parameter according to the type of the visual effect indicated by the effect specification information.

2. The imaging apparatus according to claim 1, wherein the light source is provided, in the housing, around an exposure aperture through which the subject light passes.

3. The imaging apparatus according to claim 2, wherein the housing includes a frame member provided with the exposure aperture, and the light source is provided on the frame member.

4. The imaging apparatus according to claim 2, wherein the housing has a housing body into which the film is loaded and the exposure aperture, and the light source is disposed around the exposure aperture in the housing body.

5. The imaging apparatus according to claim 1, wherein the housing has a housing body into which the film is loaded, and the light source is fixed to the housing body.

6. The imaging apparatus according to claim 1, wherein a diffusion member that diffuses the effect light is included, and the effect light diffused by the diffusion member is emitted to the photosensitive surface.

7. The imaging apparatus according to claim 6, wherein a plurality of the light sources are provided, and the diffusion member is a member in which at least two diffusion parts respectively disposed facing at least two light sources among the plurality of light sources are connected to a coupling part that couples the diffusion parts.

8. The imaging apparatus according to claim 7, wherein the diffusion member further includes a light shielding member that shields effect light leaking from the coupling part toward the photosensitive surface by propagating from the diffusion part to the coupling part.

9. The imaging apparatus according to claim 1, wherein a plurality of the light sources are provided, and the plurality of light sources are disposed at positions symmetrical with respect to a center of the photosensitive surface of the film in a case where the film in a loaded state is viewed in a plan view.

10. The imaging apparatus according to claim 1, wherein the light source is provided at a position facing an outer peripheral edge of the photosensitive surface of the film.

11. The imaging apparatus according to claim 10, wherein the light source is provided at a position facing at least one of four corners of the photosensitive surface of the film.

12. The imaging apparatus according to claim 10, wherein the light source is provided at a position facing an intermediate position of at least one of four sides of the photosensitive surface of the film.

13. The imaging apparatus according to claim 1, wherein the light source is disposed concentrically with respect to a center of the photosensitive surface of the film in a case where the film in a loaded state is viewed in a plan view.

14. The imaging apparatus according to claim 1, wherein one light source is provided in the housing.

15. The imaging apparatus according to claim 1, wherein the light source is configured of a plurality of colors of light emitting elements that emit light of different colors, and is capable of emitting a plurality of types of the effect light by adjusting a light amount ratio of the pieces of light emitted by the light emitting elements of respective colors.

16. The imaging apparatus according to claim 15, wherein the light emitting elements of the respective colors perform pulse light emission according to a periodically input driving pulse, and the parameter includes at least one of a duty ratio of the driving pulse of the light emitting element or a light emission time decided by a repetition number of the driving pulse.

17. The imaging apparatus according to claim 16, wherein the light emitting element is an LED.

18. The imaging apparatus according to claim 1, wherein the processor is configured to, in a case where designation by a user regarding an exposure amount of the photosensitive surface is received, execute exposure control of adjusting an amount of the subject light reaching the photosensitive surface according to an amount of the effect light emitted from the light source.

19. The imaging apparatus according to claim 18, wherein the exposure control is control of executing adjustment of setting a light amount, which is obtained by subtracting the amount of the effect light from a light amount according to the designation by the user regarding the exposure amount, to the amount of the subject light.

20. The imaging apparatus according to claim 1, wherein the film is an instant film in which a developer for developing a latent image recorded on the photosensitive surface is sealed and the developer is capable of being applied on the exposed photosensitive surface.

21. The imaging apparatus according to claim 1, wherein the visual effect includes a tone effect which is an effect of adding a change to color development of the film.

22. A control method for a camera including a housing loaded with a film on which a photosensitive surface is caused to be exposed to subject light to record a subject image and a light source that is provided in the housing and is capable of emitting, to the photosensitive surface, effect light that exposes the photosensitive surface in a manner superimposed on the subject light to impart a visual effect to the subject image, in which the light source is capable of emitting a plurality of types of effect light for obtaining different types of the visual effect according to setting of a parameter, the control method comprising:

acquiring effect specification information capable of specifying the type of the visual effect; and executing control of setting the parameter according to the type of the visual effect indicated by the effect specification information.

23. A non-transitory storage medium storing a program causing a computer to execute a process in a camera including a housing loaded with a film on which a photosensitive surface is caused to be exposed to subject light to record a subject image and a light source that is provided in the housing and is capable of emitting, to the photosensitive surface, effect light that exposes the photosensitive surface in a manner superimposed on the subject light to impart a visual effect to the subject image, in which the light source is capable of emitting a plurality of types of effect light for obtaining different types of the visual effect according to setting of a parameter, the process comprising:

acquiring effect specification information capable of specifying the type of the visual effect; and executing control of setting the parameter according to the type of the visual effect indicated by the effect specification information.

24. An imaging apparatus comprising:

a housing in which an imaging element that causes a light-receiving surface to be exposed to subject light to capture a subject image is disposed; and a light source that is provided in the housing and is capable of emitting, to the light-receiving surface, effect light that exposes the light-receiving surface in a manner superimposed on the subject light to impart a visual effect to the subject image, wherein the light source is capable of emitting a plurality of types of the effect light for obtaining different types of the visual effect according to setting of a parameter, the imaging apparatus further comprises a reception unit that receives designation of a type of the visual effect, and a processor, and the processor is configured to:

acquire effect specification information capable of specifying the type of the visual effect received via the reception unit; and execute control of setting the parameter according to the type of the visual effect indicated by the effect specification information.

* * * * *